United States Patent
Gottesfeld et al.

(10) Patent No.: US 7,943,258 B2
(45) Date of Patent: May 17, 2011

(54) ALKALINE MEMBRANE FUEL CELLS AND APPARATUS AND METHODS FOR SUPPLYING WATER THERETO

(75) Inventors: Shimshon Gottesfeld, Niskayuna, NY (US); Dario Dekel, Ramat-Yishai (IL); Ziv Gottesfeld, Gan Yoshiya (IL); Stanislav David Simakov, Nazareth Elite (IL)

(73) Assignee: CellEra, Inc., Niskayuna, NY (US)

( * ) Notice: Subject to any disclaimer, the term of this patent is extended or adjusted under 35 U.S.C. 154(b) by 10 days.

(21) Appl. No.: 12/477,669

(22) Filed: Jun. 3, 2009

(65) Prior Publication Data

US 2010/0021777 A1 Jan. 28, 2010

Related U.S. Application Data

(60) Provisional application No. 61/204,067, filed on Dec. 31, 2008, provisional application No. 61/058,607, filed on Jun. 4, 2008.

(51) Int. Cl.
*H01M 8/00* (2006.01)
*H01M 8/10* (2006.01)
(52) U.S. Cl. .................. 429/400; 429/479; 429/483
(58) Field of Classification Search .............. 429/400, 429/479–483
See application file for complete search history.

(56) References Cited

U.S. PATENT DOCUMENTS

| | | | |
|---|---|---|---|
| 3,909,206 A | 9/1975 | Katz | |
| 4,191,453 A | 3/1980 | Beni et al. | |
| 4,253,922 A * | 3/1981 | Welch | 205/512 |
| 4,910,099 A | 3/1990 | Gottesfeld | |
| 5,082,550 A | 1/1992 | Rishpon et al. | |
| 5,108,573 A | 4/1992 | Rubinstein et al. | |
| 5,227,042 A | 7/1993 | Zawodzinski et al. | |
| 5,366,821 A * | 11/1994 | Merritt et al. | 429/422 |
| 5,368,717 A | 11/1994 | Gottesfeld et al. | |
| 5,527,640 A | 6/1996 | Rudge et al. | |
| 6,140,466 A | 10/2000 | Barbas, III et al. | |
| 6,203,936 B1 * | 3/2001 | Cisar et al. | 429/518 |
| 6,221,523 B1 * | 4/2001 | Chun et al. | 429/483 |
| 6,242,568 B1 | 6/2001 | Barbas, III et al. | |
| 6,296,964 B1 | 10/2001 | Ren et al. | |
| 6,356,433 B1 | 3/2002 | Shi et al. | |
| 6,383,640 B1 | 5/2002 | Shi et al. | |
| 6,458,479 B1 | 10/2002 | Ren et al. | |
| 6,488,837 B1 | 12/2002 | Ren et al. | |
| 6,686,081 B2 | 2/2004 | Gottesfeld | |
| 6,696,382 B1 | 2/2004 | Zelenay et al. | |

(Continued)

OTHER PUBLICATIONS

International Search Report and Written Opinion from PCT/US2009/046146.

(Continued)

*Primary Examiner* — Karie O'Neill Apicella
(74) *Attorney, Agent, or Firm* — Mintz Levin Cohn Ferris Glovsky and Popeo, P.C.

(57) ABSTRACT

A device to produce electricity by a chemical reaction without the addition of liquid electrolyte comprises an anode electrode, a polymer membrane electrolyte fabricated to conduct hydroxyl (OH—) ions, the membrane being in physical contact with the anode electrode on a first side of the membrane, and a cathode electrode in physical contact with a second side of the membrane. The anode electrode and cathode electrode contain catalysts, and the catalysts are constructed substantially entirely from non-precious metal catalysts. Water may be transferred to the cathode side of the membrane from an external source of water.

13 Claims, 15 Drawing Sheets

U.S. PATENT DOCUMENTS

| | | |
|---|---|---|
| 6,821,658 B2 | 11/2004 | Acker et al. |
| 6,824,899 B2 | 11/2004 | Acker et al. |
| 6,841,283 B2 * | 1/2005 | Breault .................. 429/494 |
| 6,890,680 B2 | 5/2005 | Beckmann et al. |
| 6,936,368 B2 | 8/2005 | Hirsch et al. |
| 6,962,760 B2 | 11/2005 | Rice et al. |
| 6,981,877 B2 | 1/2006 | Ren et al. |
| 6,986,961 B1 | 1/2006 | Ren et al. |
| 6,991,865 B2 | 1/2006 | Acker et al. |
| 7,083,708 B2 | 8/2006 | Chlistunoff et al. |
| 7,179,501 B2 | 2/2007 | Beckmann et al. |
| 7,282,293 B2 | 10/2007 | Ren et al. |
| 7,332,241 B2 | 2/2008 | Jaouen |
| 7,407,721 B2 | 8/2008 | Ren et al. |
| 7,510,794 B2 | 3/2009 | Gottesfeld et al. |
| 7,541,109 B2 | 6/2009 | Ren et al. |
| 7,638,215 B2 | 12/2009 | Ren et al. |
| 2002/0034675 A1 | 3/2002 | Starz et al. |
| 2002/0086193 A1 | 7/2002 | Acker et al. |
| 2002/0122966 A1 | 9/2002 | Acker et al. |
| 2003/0031907 A1 | 2/2003 | Gottesfeld |
| 2003/0143448 A1 | 7/2003 | Keefer |
| 2003/0157395 A1 | 8/2003 | Ren et al. |
| 2003/0157396 A1 | 8/2003 | Beckmann et al. |
| 2004/0023086 A1 | 2/2004 | Su et al. |
| 2004/0062980 A1 | 4/2004 | Ren et al. |
| 2004/0069144 A1 | 4/2004 | Wegeng et al. |
| 2004/0076859 A1 | 4/2004 | Gottesfeld |
| 2004/0166401 A1 | 8/2004 | Srinivas |
| 2004/0191584 A1 | 9/2004 | Rice et al. |
| 2004/0209136 A1 * | 10/2004 | Ren et al. .................. 429/30 |
| 2004/0209143 A1 | 10/2004 | Hirsch et al. |
| 2004/0209154 A1 | 10/2004 | Ren et al. |
| 2004/0265680 A1 | 12/2004 | Ren et al. |
| 2005/0026005 A1 | 2/2005 | Chlistunoff et al. |
| 2005/0053811 A1 | 3/2005 | Acker et al. |
| 2005/0147862 A1 * | 7/2005 | Knoop et al. .................. 429/34 |
| 2005/0170224 A1 | 8/2005 | Ren et al. |
| 2005/0181271 A1 | 8/2005 | Ren et al. |
| 2005/0196666 A1 | 9/2005 | Gottesfeld et al. |
| 2005/0227140 A1 | 10/2005 | Beckmann et al. |
| 2006/0068271 A1 | 3/2006 | Ren et al. |
| 2006/0266642 A1 | 11/2006 | Akle et al. |
| 2006/0286429 A1 * | 12/2006 | Shiepe et al. .................. 429/38 |
| 2007/0128500 A1 * | 6/2007 | Marsacq et al. ................. 429/42 |
| 2008/0008921 A1 | 1/2008 | Miura |
| 2008/0032182 A1 | 2/2008 | Ren et al. |
| 2008/0115875 A1 | 5/2008 | Jeng et al. |
| 2008/0145721 A1 | 6/2008 | Shapiro et al. |
| 2008/0156549 A1 * | 7/2008 | Leboe et al. ................. 180/65.1 |
| 2008/0166542 A1 * | 7/2008 | Sung et al. ................. 428/315.9 |
| 2008/0184882 A1 | 8/2008 | White |
| 2008/0187824 A1 | 8/2008 | Tomantschger |
| 2008/0206616 A1 | 8/2008 | Atanassova et al. |
| 2009/0004529 A1 | 1/2009 | Gur et al. |
| 2009/0042092 A1 | 2/2009 | Martinent et al. |
| 2010/0021777 A1 | 1/2010 | Gottesfeld et al. |
| 2010/0216052 A1 | 8/2010 | Gottesfeld et al. |

OTHER PUBLICATIONS

Drese et al., "Synthesis-Structure-Property Relationships for Hyperbranched Aminosilica $CO_2$ Adsorbents", Advanced Functional Materials, 19:3821-3832 (2009).

* cited by examiner

*ANODE PROCESS:*

$2H_2 + 4OH^- = 4H_2O + 4e$

*CATHODE PROCESS:*

$4e + O_2 + 2H_2O = 4OH^-$

*CELL PROCESS:*

$2H_2 + O_2 = 2H_2O$

Liquid water supply Membrane Surface along MEA periphery:
Beneficial effect on H2/Air AMFC performance
NO WATER SUPPLY Liquid water supply Membrane Surface along MEA periphery:
Beneficial effect on H2/Air AMFC performance
APPLYING LIQUID WATER SUPPLY Comparatives power/current relationships for $H_2/O_2$, liquid electrolyte and Pt-free AEM-FCs

ALKALINE MEMBRANE FUEL CELLS AND APPARATUS AND METHODS FOR SUPPLYING WATER THERETO

RELATED APPLICATIONS

This application claims priority to Provisional Application Ser. No. 61/204,067 filed Dec. 31, 2008, entitled, "Methods and Apparatuses for Supplying Water to an Alkaline Polymer Electrolyte Membrane Fuel Cell (AMFC)," as well as to Provisional Application Ser. No. 61/058,607, filed Jun. 4, 2008 entitled, "Alkaline Membrane Fuel Cell," each of which is incorporated by reference herein in its entirety.

TECHNICAL FIELD

Alkaline membrane fuel cells ("AMFCs") are a lower-cost alternative to proton-exchange membranes ("PEM") fuel cells which are dependent on the use of expensive precious metals. AMFCs eliminate the use of such precious metals, thereby reducing costs of manufacture. AMFCs should be designed with an effective supply of water to the cathode side of the fuel cell to ensure a state of hydration independent of cell current state, but require highly effective membrane/electrode assemblies to achieve commercial level performance with no added liquid electrolyte. A fuel cell preconditioning or pretreatment method hydrates ionomer components to achieve a required or desired degree of ionic conductivity. Also, liquid water may be transferred to the cathode side of the membrane from an external source of water.

BACKGROUND

Fuel cells have generated a lot of attention recently due to increased demands for efficient and clean electricity generation. A major inhibitor to mass commercialization of fuel cells is cost. AMFCs offer a promising solution to reduce the cost of effective fuel cells. Alkaline membrane fuel cells are similar to PEM fuel cells but the membranes are designed to transport hydroxide ions instead of protons. One of the biggest cost factors of PEM fuel cells is their dependency on a precious metal such as platinum, which is used as both the air cathode and hydrogen anode catalyst. Platinum is an extremely rare metal, occurring as only 0.003 ppb in the Earth's crust, and is 30 times rarer than gold. Reducing the amount of platinum required (and thus cost) has been a major focus of PEM fuel cell research. Alkaline membrane fuel cells allow elimination of Pt altogether from the fuel cell catalyst, relying on the use of non-precious metal catalysts, which can greatly reduce the cost of fuel cells. The milder electrochemical environment of the alkaline membrane, that allows replacing precious metal catalysts by much less expensive metal catalysts, also allows using stack hardware of much lower cost and superior properties.

Several reports on building and testing of AMFCs on a laboratory scale, have described cell testing with aqueous electrolyte, typically aqueous KOH, continuously added as part of the fuel feed stream, found necessary to achieve reasonable performance. AMFC Performance without any added aqueous electrolyte has been found to be at least an order of magnitude lower than that obtained with proton conducting membrane fuel cells which, as a rule, do not use any added electrolyte. Once liquid alkaline electrolyte is added, a polymer electrolyte fuel cell loses some key advantages of this family of cells, including the avoidance of electrolyte management issues and maintenance of a safe exhaust stream which consists of water vapor alone in the case of hydrogen fuel. As long as it is a prerequisite for obtaining acceptable AMFC performance, continuous liquid alkaline electrolyte addition seriously diminishes the practical value of AMFCs.

There is a significant challenge, however, to the development of optimized electrodes and membrane-electrode assemblies ("MEAs") specifically designed for AMFCs which do not use any added liquid electrolyte. The challenge has primarily to do with the limited conductivity of OH— ion conducting polymers demonstrated to date, requiring judicious choice of recast ionomer material for the catalyst "ink" and a catalyst layer thickness and structure optimized for minimal transport limitations at the highest demand current.

When looking at the much more developed technology of PEM fuel cells as possible source of information, it is very important to recognize some substantial differences between the technology based on alkaline membrane and the technology based on an acidic membrane. Not only is the ionic conductivity of the alkaline ionomer substantially lower, the sides of the cell where water is generated and consumed are reversed. In the AMFC, water is generated on the fuel side and consumed on the oxygen, or air side. This creates AMFC technical challenges of special nature that are not shared with the PEM counterpart. Product water removal without loss of fuel becomes an important issue as result of the water generation at the fuel electrode. Furthermore, cathode dry out, resulting in strong cathode performance loss, is a clear danger in the AMFC, because water is being consumed at the cathode, rather than generated there as in the case of the PEM cell, and the active flow of air by the cathode would tend to carry with it any cathode water out the cathode exhaust. Water management therefore has a different problem set and a higher degree of severity in the AMFC.

Fuel cells are often operated with pure hydrogen gas as the fuel. When using pure hydrogen as a fuel, a PEM fuel cell can be operated in what is known as a "dead-end" anode configuration, which means the anode compartment has an inlet, but no outlet. Design of a fuel cell based on a dead-ended anode, has been recognized as having valuable advantages, including system simplicity, zero fuel emissions and high fuel utilization. However, in an AMFC, water is a product that is generated in the anode side of the cell. Consequently, a dead-ended anode in an AMFC requires that there be a way to continuously remove excess product water from the anode. Product water removal from an operating AMFC through an open-ended anode could mimic the established mode of water product removal from fuel cells based on proton conducting membranes, where water is generated at the air cathode and leaves through the exhaust of the open-ended cathode. Such straightforward solution for excess water removal will, however, result, in the case of the AMFC, in significant fuel loss at high hydrogen flow rates, or poor utilization of active electrode area when the rate of fuel supply is lowered sufficiently to avoid fuel loss. In summary, AMFC area power densities significantly above 100 mW/cm$^2$, while using non-Pt catalysts and avoiding added liquid electrolyte, has not been described to date. Also, effective AMFC water management in general, and particularly water management without fuel loss, the case of an AMFC configured with a dead-ended anode, have not been described to date.

SUMMARY

Various aspects of the invention may provide one or more of the following capabilities. An AMFC that does not require the use of liquid electrolyte may be provided with commercially acceptable power density and conversion efficiency. Effective hydration of a liquid electrolyte-free AMFC as required to achieve high power density and high conversion efficiency, can be established by means of properly selected membrane and electrodes and by cell pre-treatment based on gradual increase of cell current up to around 1 A/cm$^2$. Membrane electrode assemblies which allow commercially acceptable AMFC performance without any added electrolyte may be provided through design and fabrication based on proper combination of recast OH— conducting ionomer and non-precious metal catalysts. An AMFC may be provided which operates with hydrogen fuel using a dead ended anode by water management which passes water generated on the fuel anode side to the cathode side to secure cell water release through the cathode. This configuration allows the AMFC to achieve high fuel utilization with a simple system configuration. Alternatively, water may be transferred to the cathode side of the fuel cell membrane from an external source of water.

These and other capabilities of the invention, along with the invention itself, will be more fully understood after a review of the following figures, detailed description, and claims.

In accordance with one aspect of the present invention, there is provided a fuel cell assembly having an anode electrode, a polymer membrane electrolyte configured to conduct hydroxyl (OH—) ions, in which the membrane is in physical contact with the anode electrode on a first side of the membrane. The cell also has a cathode electrode which is in contact with the second, opposite side of the membrane. Both electrodes contain catalysts and these catalysts are constructed substantially from non-precious materials.

In accordance with a further aspect of the present invention, there is provided an AMFC assembly having anode and cathode electrodes, as well as a polymer membrane electrolyte which conducts hydroxyl ions (OH—) which is in physical contact with the anode and cathode electrodes on each of its sides. Further, an external source of water transfers water to the cathode side of the polymer membrane. The anode and cathode electrodes each contain catalysts formed substantially of non-precious metals.

BRIEF DESCRIPTION OF THE DRAWINGS

In the accompanying drawings, described below, like reference characters refer to the same or similar parts throughout the different views. The drawings are not necessarily to scale, emphasis instead being placed upon illustrating particular principles of the methods and apparatus characterized in the Detailed Description.

DETAILED DESCRIPTION

In describing embodiments of the invention, specific terminology is used for the sake of clarity. For purposes of description, each specific term is intended to at least include all technical and functional equivalents that operate in a similar manner to accomplish a similar purpose. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Moreover, while this invention has been shown and described with references to particular embodiments thereof, those skilled in the art will understand that various other changes in form and details may be made therein without departing from the scope of the invention. The implementations set forth in the following description do not represent all implementations consistent with the subject matter described herein. Instead, they are merely some examples consistent with certain aspects related to the described subject matter.

In some implementations, an alkaline membrane fuel cell is provided that allows dead ended anode operation. The dead ended anode operation enables a simple method of fuel control to the fuel cell along with high fuel utilization. Some embodiments may include an alkaline membrane fuel cell which provides improved power density through the use of an improved method of MEA preparation with an ionomer solution specifically developed for alkaline membrane fuel cell electrode preparation. Some embodiments include an AMFC that does not utilize precious metal catalysts. Some embodiments include an AMFC that does not utilize liquid electrolyte addition.

An ionomer is a polymeric electrolyte that comprises a poly-hydrocarbon (aromatic and non-aromatic hydrocarbons), or poly-perfluorocarbon backbone and a fraction of ion carrying units (usually no more than 15%). To incorporate the ion conducting polymer into the structure of a fuel cell electrode, a solution of the corresponding ionomer is added to the catalyst when the active layer of the electrode is prepared. In addition, additives for catalyst suspension stability and/or for viscosity adjustment can be added. Following a curing, or cross-linking step, or/and further chemical treatment to increase ionic conductivity, the ionomer in the electrode converts to a polymer resembling the membrane polymer.

Figure 1:
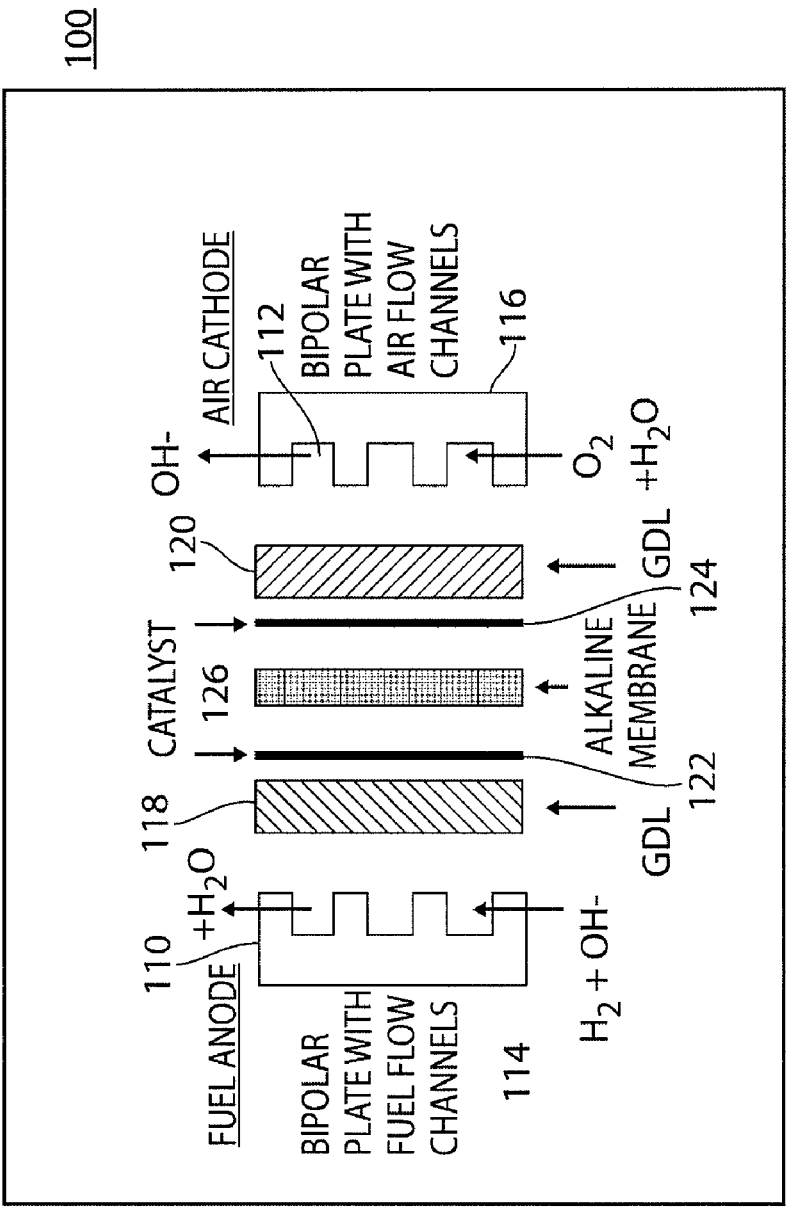
FIG. 1 is a schematic illustration of an alkaline membrane fuel cell apparatus with open ended flow on both hydrogen fuel and air sides.

Referring to FIG. 1, a generic alkaline membrane fuel cell 100 includes a fuel anode 110, an air cathode 112, an anode bipolar plate 114, a cathode bipolar plate 116, an anode gas diffusion layer GDL 118, a cathode gas diffusion layer GDL 120, an anode catalyst layer electrode 122, a cathode catalyst layer electrode 124, and an alkaline membrane 126. While a single cell 100 is shown in FIG. 1, a plurality of cells may be configured together to form a fuel cell stack. In the case of the AMFC, metal bipolar plates made of stainless steel or of nickel-coated aluminum, can provide a compact and robust stack hardware of low corrosion susceptibility. The fuel cell consumes hydrogen as a fuel to produce water and electrical energy. In an alkaline membrane fuel cell 100, hydroxyl (OH—) ions are transported through the membrane 126, to the anode to react with the hydrogen which produces water in the anode. At the cathode, oxygen reacts with electrons passing through an external electrical circuit connecting the anode to the cathode and with water to form "new" OH— ions.

The anode bipolar plate 114, both serves as a current collector for the anode of the cell and defines hydrogen fuel flow channels. The cathode bipolar plate 116, serves as both a current collector for the cathode of the cell and defines oxygen or air flow channels. The benign chemical nature of the alkaline membrane and the very low probability that the pH of the water in the cell will go under pH=5.8, opens the door to the use of unique metal hardware for AMFC bipolar plates, that cannot be used for PEM fuel cell stacks. Stack hardware made of aluminum has strong advantages of light weight and of high thermal conductivity which enables effective heat removal from the stack. It does require, however, proper surface treatment to render the surface high electronic conductivity and thereby strongly lower the high contact resistance encountered on contacting an aluminum plate to another electronically conducting plate by mechanical pressure only. An effective solution was provided here by electroless coating of 25 micrometer thick film of nickel metal onto the machined, aluminum bipolar plates, employing commercially available and easily formed aluminum plate material, for example type 6061. Such coating proved highly efficient in having a contact resistances 5-10 times lower than the cell membrane resistance and proved stable under AMFC operating conditions on both the anode and cathode sides. The anode and cathode gas diffusion layers 118, 120 evenly disperse the respective gases from the flow channels over the entire face of the catalyst layer 122, 124 and forms an electrical connection between the catalyst layer 122, 124 and the respective bipolar plate 114, 116. The alkaline membrane 126, is specifically designed for the alkaline membrane fuel cell 100 and is configured for OH— ion conductivity and proper water management. When viewed as an assembled unit, the anode catalyst layer 122 & anode GDL 118, alkaline membrane 126, and cathode catalyst layer electrode 124 & cathode GDL 120, are often referred to as a 5-layer Membrane Electrode Assembly (MEA). Some of the embodiments of alkaline membrane fuel cells described herein utilize non-precious metal catalysts for the electrode catalyst layers 122, 124. Some examples of non-precious metal catalysts could include silver or cobalt on the cathode and nickel on the anode. These examples are provided for reference only and should not be interpreted as the only types of potential non precious metal catalysts which can be used in conjunction with the systems and methods described herein.

Alkaline membrane fuel cell membrane/electrode assembly (MEA) fabrication may be pursued using several methods: a first method based on using a mixture of metal catalyst and solubilized OH— ion conducting polymer (a catalyst "ink") and/or a second method based on a layer of the catalyst deposited onto the membrane surface, with or without post-impregnation by recast polymer and/or a third method where an electrode with a catalyst layer prefabricated using another, non-conducting bonding agent, is post-impregnated by the ionomer.

MEA fabrication for AMFCs based on the application of a catalyst ink, has been implemented with the dispersion of catalyst particles in a solution containing a dissolved anion conducting ionomer in an appropriate solvent with optional viscosity adjusted by additives, e.g., glycerol, and optional suspension stabilizing additives, e.g., ethylene glycol. In some cases, a mixture of anion exchange ionomers is used to optimize viscosity and ionic properties of the ink. Catalysts for this anion conductive inks include Cobalt based metal particles, Silver based metal particles, and other non-precious metal catalysts, either alone or deposited onto high surface carbon structures.

Following vigorous stirring, the resulting catalyst ink may be sprayed onto a decal sheet made of Teflon and, after drying, may be hot pressed onto the membrane in chloride, or bromide form at temperatures around 100 degrees C. for about 1 to 3 minutes. Alternatively, spraying or brushing of the ink may be performed directly onto the GDL, or the membrane. Screen print and/or a tape casting methods can also be used to deposit the ink onto a Teflon sheet, the CDL, or the membrane. A five layer MEA may be formed by adding carbon cloth GDL layers on both sides of a catalyzed membrane and hot pressing under similar conditions as above. The MEA may be next ion-exchanged in 1M (molar) NaOH or KOH solution to bring the ionomer to the OH— form and is then washed with water and inserted in the cell, or stack. Alternatively, the membrane is converted to OH— form before the electrodes are hot-pressed onto it.

For fabrication of AMFC MEAs based on ionomer impregnation of gas diffusion electrodes (GDEs), commercially available phosphoric acid fuel cell type GDEs (E-Tek division of BASF) may be utilized. These GDEs have a catalyst layer in front of a GDL, with the catalyst particles bonded by PTFE. To impregnate such catalyst layer by OH— conducting ionomer, a solution of the ionomer in an appropriate solvent may be, for instance, sprayed so as to infiltrate the porous layer. Following solvent evaporation, an ionomer network is generated within the catalyst layer providing effective ionic access to the catalyst particles.

Another preferred mode for optimizing conductance and stability of the ionomer in the electrode, is to use the polymer in its precursor chloromethyl form, in the preparation of the ink, apply the ink onto a GDL and next immerse the electrode built with the precursor polymer in a concentrated solution of a mono-amine or a poly-amine, or a mixture of mono- and poly-amines. In this way the conductivity/stability properties of the ionomer in the electrode is optimized after the recasting step, through addition of ion-conducting groups and introducing cross-linking. Larger amines are preferred in order to increase stabilization by cross-linking of the recast polymer in the environment of fuel cells. After aminating, the ionomer in the electrode needs to be ion exchanged with NaOH or KOH solution, washed with water, and pressed onto the membrane, as described before.

The last procedure can be also used when infiltrating ionomer in precursor, chloromethyl form into a pre-fabricated electrodes, followed by the amine(s) treatment described.

Design of an MEA for a polymer electrolyte fuel cell which is challenged by relatively low ionic conductivity, requires new solutions, different from those provided by the extensive work on proton conducting membrane fuel cells. In such past work, the catalyst layer has been typically constructed of 20% volume fraction each of carbon-supported Pt catalyst and of recast ionomer, with 60% void volume maintained enabling sufficient diffusivity of gaseous reactants and products. The overall thickness of the catalyst layer in proton conducting membrane fuel cells, has been typically 5-20 µm. In the case of the AMFC, as long as the conductivity of the OH— ion conducting ionomer within the catalyst layer is only 30%-50% that of the proton conducting counterpart, the effective thickness of the catalyst layer that enjoys good ionic access will be likely not more than 5 µm and possibly less. In a hydrogen/air AMFC, the important impact of such limited access of ions to/from catalyst sites, is on the performance of the air electrode. With the oxygen reduction cathode process being intrinsically slow, a larger number of active catalyst sites per unit membrane area is vital for achieving higher air cathode performance and, consequently, higher cell performance. There are several possible ways to maximize catalyst layer performance under given limits of AMFC ionomer conductivity. According to one such approach, the ionomer used for the AMFC catalyst layer fabrication, may be chosen to have significantly higher ionic concentration vs. that of the ionomer used for membrane fabrication. Enhancing the conductivity of the membrane itself by increasing the volume concentration of ions, is limited by mechanical integrity demands. At ionic concentrations that are too high, the membrane tends to swell significantly when fully hydrated and, consequently, the membrane material loses mechanical integrity, particularly so following repeated membrane hydration/dehydration cycles. In contrast, the ionomer within the catalyst layer structure is supported on the solid catalyst and faces somewhat lower mechanical integrity demands. It could, therefore, be prepared with higher OH— ion concentration, thereby closing some of the specific conductivity gap between protonic and OH— ion conducting ionomers. Moreover, with the cathode in the AMFC consuming water (rather than generating water), an ionomer of higher ion concentration recast within the cathode catalyst structure, is beneficial in preserving acceptable conductivity levels at lower water activities. Also, the risk of ionomer over-swelling is less of an issue in the relatively dry AMFC cathode.

A second approach to enhancing MEA performance when ionomer conductivities are lower, is by optimized placement of the catalyst. Given the limited access of ions to catalyst sites several micrometers away from the membrane surface, placement of the highest possible population of active catalyst sites nearest the membrane surface, has to be a leading principle in catalyst layer design. One way to pursue optimized catalyst placement/distribution, is by building in a distinguishable way the 1-2 µm of the catalyst layer immediately adjacent the membrane surface. Such a catalyst layer "front" is to be as heavy as possible in active metal surface area, i.e., heavier than the normal set in proton conducting polymer electrolyte cells. Additionally, the mode of catalyst application for such "front" of the catalyst layer, could be quite different than the catalyst ink application routine commonly used in PEM cells. One possible such mode, is to use an array of micro-dendrites, sputter coated with the selected metal catalyst and implanted into the membrane surface, along the lines of a technology developed to date for Pt catalysts and proton conducting membranes. The other option is to sputter nanometer sized metal catalyst nano-patches, or nano-grains onto the membrane surface, in lieu of, or in addition to the implanted, catalyst coated dendrite array. Such approaches achieve placement of maximum catalyst within about 1 µm from the membrane surface—a key for achieving maximum catalyst utilization under circumstances of limited ionomer conductivity.

As to the unique challenge of proper water release from the AMFC, an option of operation with a dead-ended anode actually exists for a hydrogen/air AMFC, in spite of the apparent conflict with the need to remove product water from the anode side of the cell. The insight required for realizing this option, is that dead ended anode operation can be sustained without build-up of over-pressure when using neat (100%) hydrogen feed and water the only anode product. Under such conditions, pressure buildup in the dead-ended anode beyond that of the hydrogen gas which is controlled by an upstream valve, is the limited pressure of saturated water vapor pressure at the cell temperature. The removal of AMFC water product in operation with a completely dead-ended anode is described herein as part of a novel AMFC platform taught.

Effective water transport across the membrane from a dead-ended side of the cell where water is being generated, to the other side of the cell where excess water is to be exhausted, is a novel idea which is applicable specifically to the alkaline membrane fuel cell. Water transport rate through alkaline membranes is sufficient for such purpose, based on their ability to pass water fluxes corresponding to 1 A/cm$^2$ following an initial cell pre-treatment step described herein.

Figure 2:
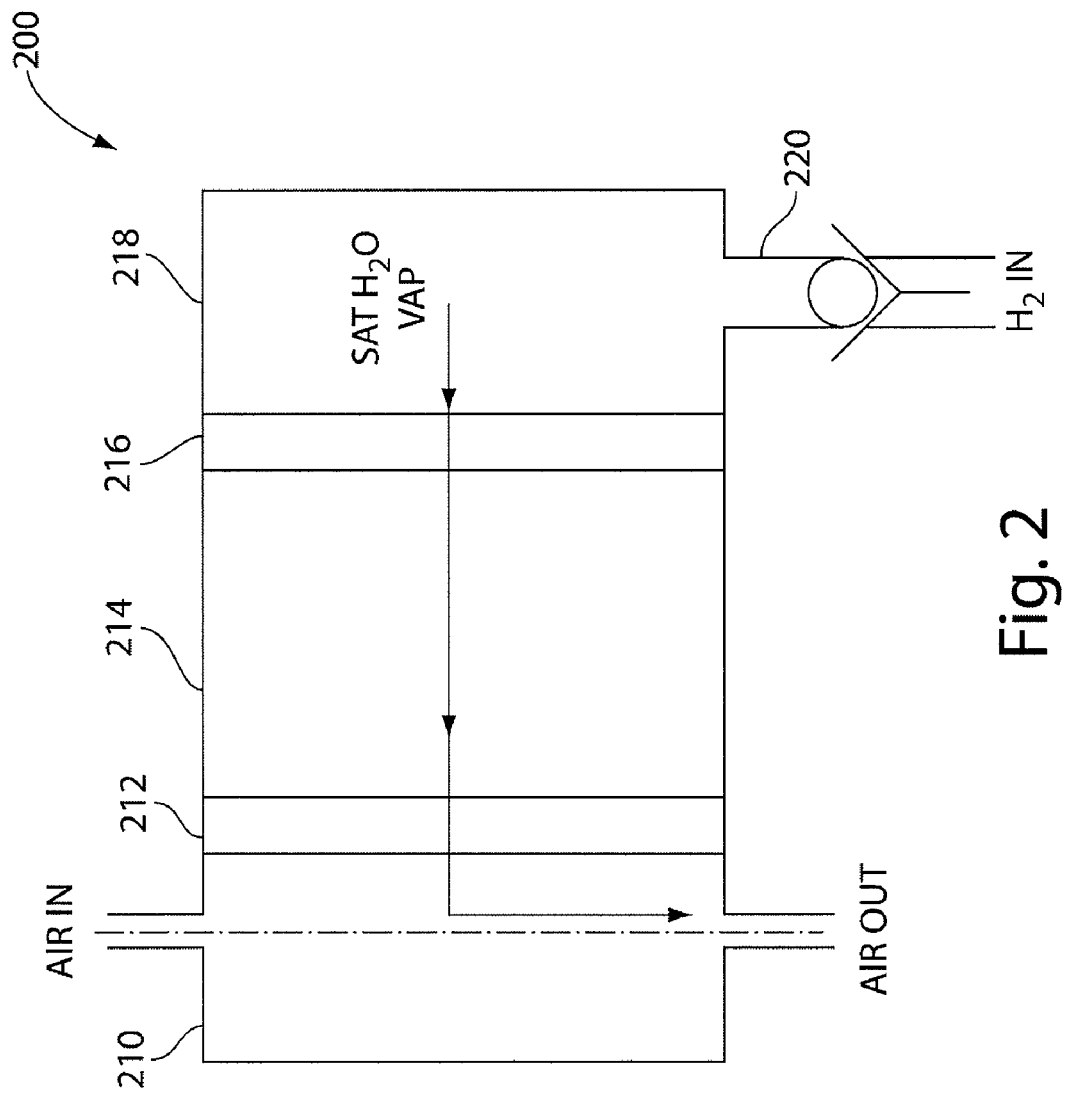
FIG. 2 is a schematic illustration of an alkaline membrane fuel cell apparatus configured for dead-ended anode operation.

FIG. 2 provides a scheme of an AMFC with dead-ended anode, showing the pattern of water flow and the mode of hydrogen entry into the dead-ended anode chamber. Referring to FIG. 2, an AMFC 200 configured for dead-ended anode operation includes a cathode chamber 210, a cathode electrode 212, an OH— conducting membrane 214, an anode electrode 216, a dead-ended anode chamber 218, and a check valve 220. The anode and cathode electrodes 216, 212 along with the membrane 214 are configured to achieve sufficient water transport rate from the anode chamber 218, through the membrane 214 to the cathode chamber 210 to facilitate excess water removal from the dead-ended anode and provide effective water supply to the water consuming cathode of the AMFC. Periodical brief purging of excess water out the anode chamber may be required and, in this case, a one-way valve may be added opening 218 to the ambient by brief application of anode overpressure.

To further facilitate water transport from anode to cathode compartment through the AMFC membrane, properties of the backing, gas diffusion layers, can be tailored to achieve water collection into the membrane on the anode side and controlled rate of water removal on the cathode side. Penetration of water through the skin of an ionomeric membrane is facilitated when the water is presented to the surface in liquid form and the surface is, consequently, well hydrated and swollen. To encourage water condensation on the surface of the membrane facing the dead-ended anode chamber where water product collects, the anode backing layer (GDL) can be rendered partly hydrophilic. This can be done, for example, by interweaving hydrophilic fibers with the wet-proofed carbon fibers to form the anode backing layer, thereby forming a backing layer cross-sectional area in contact with the membrane surface which enables, on part of it, condensation of water along hydrophilic fibers and, on the rest of it, diffusion of hydrogen through pores with hydrophobic walls, defined by the wet-proofed carbon fibers.

Figure 3:
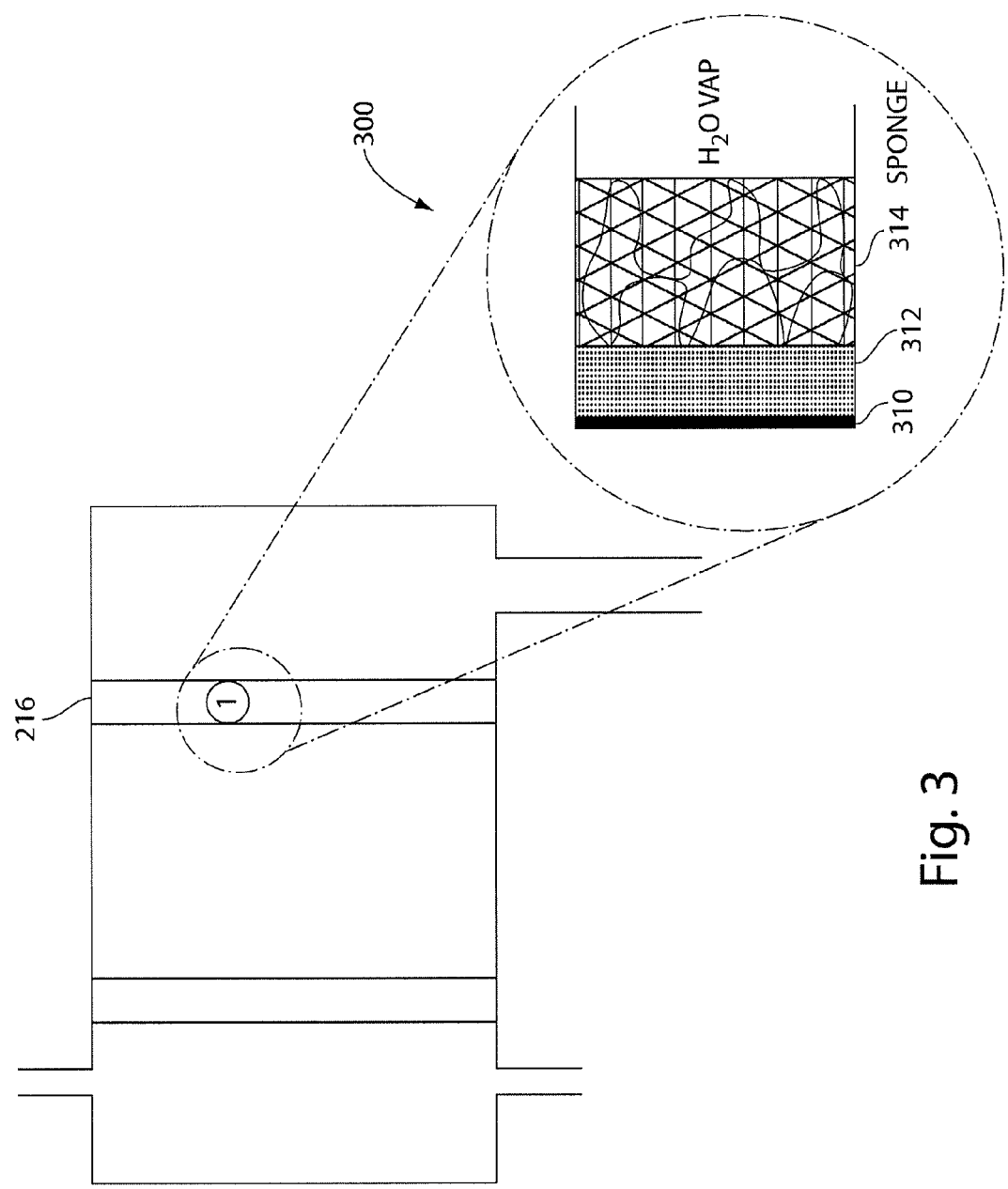
FIG. 3 is a schematic illustration of some of the components of the anode electrode of an alkaline membrane fuel cell with a dead-ended anode.

FIG. 3 describes schematically the components of the anode electrode for an AMFC operating with a dead-ended anode and zero, or minimal supply of water from an external source. Referring to FIG. 3 with further reference to FIG. 2, the anode electrode 216 includes as shown in the close up view 300, a catalyst layer front 310, a remainder of the catalyst layer 312, and an anode gas diffusion backing layer 314. As described above the catalyst layer front 310 is immediately adjacent to the membrane surface 214. The inclusion of a catalyst layer front 310 enhances and optimizes the MEA performance through the placement of a high concentration of active catalyst sites closest to the membrane surface 214. In various embodiments, the catalyst layer front 310 may be applied by sputtering, e-beam or electroless deposition. The rest of the catalyst layer 312, is behind the catalyst layer front 310 and is adjacent to the anode gas diffusion backing layer 314. In some embodiments, the anode gas diffusion backing layer 314 may be interweaved with a hydrophilic fiber as described above which acts as a sponge to facilitate water transport from the anode 218, through the membrane 214 to the cathode 210, by presenting the membrane surface with water in liquid form that has been produced in the anode 218, even when the water collected in 218 is all in mostly in vapor form.

AMFC cathode parameters that need optimization to ensure water release at a desirable rate, depend on whether cell operation is with active/forced air supply to the cathode or by natural convection "air breathing" alone. In the case of active air flow, one important issue is to avoid cathode dry-out by entry of dry air which then collects water moisture after entry and sweeps it out while exiting the stack. This issue has been addressed in the case of proton conducting polymer electrolyte fuel cells, by using various types of water exchangers upstream of the cathode inlet, that allow dry air entering the cell to extract moisture from the exhaust air stream. Various designs of water exchangers may be incorporated into the overall water management system of the AMFC to ensure that the cell operates on a "water neutral" basis. The term "water neutral" means that the cell or stack of cells generates all of its required water internally without the need for an external supply of water. In the specific case of an AMFC, when operating with an open-ended anode a water exchanger can be used to pass on water to the incoming air stream not only from the cathode exhaust but also from the anode exhaust, as explained below for "mode 2" type humidification of AMFCs.

Another tool to control the rate of water vapor swept out the cell with the air stream, is a highly hydrophobic micro-porous layer made of PTFE bonded carbon powder, placed between the cathode catalyst layer and the cathode backing layer (cathode GDL). Such micro-porous layer is tasked here with lowering the rate of release of water to the air stream. Together with facilitated incorporation of product water into the anode side of the membrane, it helps confine enough water within the MEA during cell operation.

Figure 4:
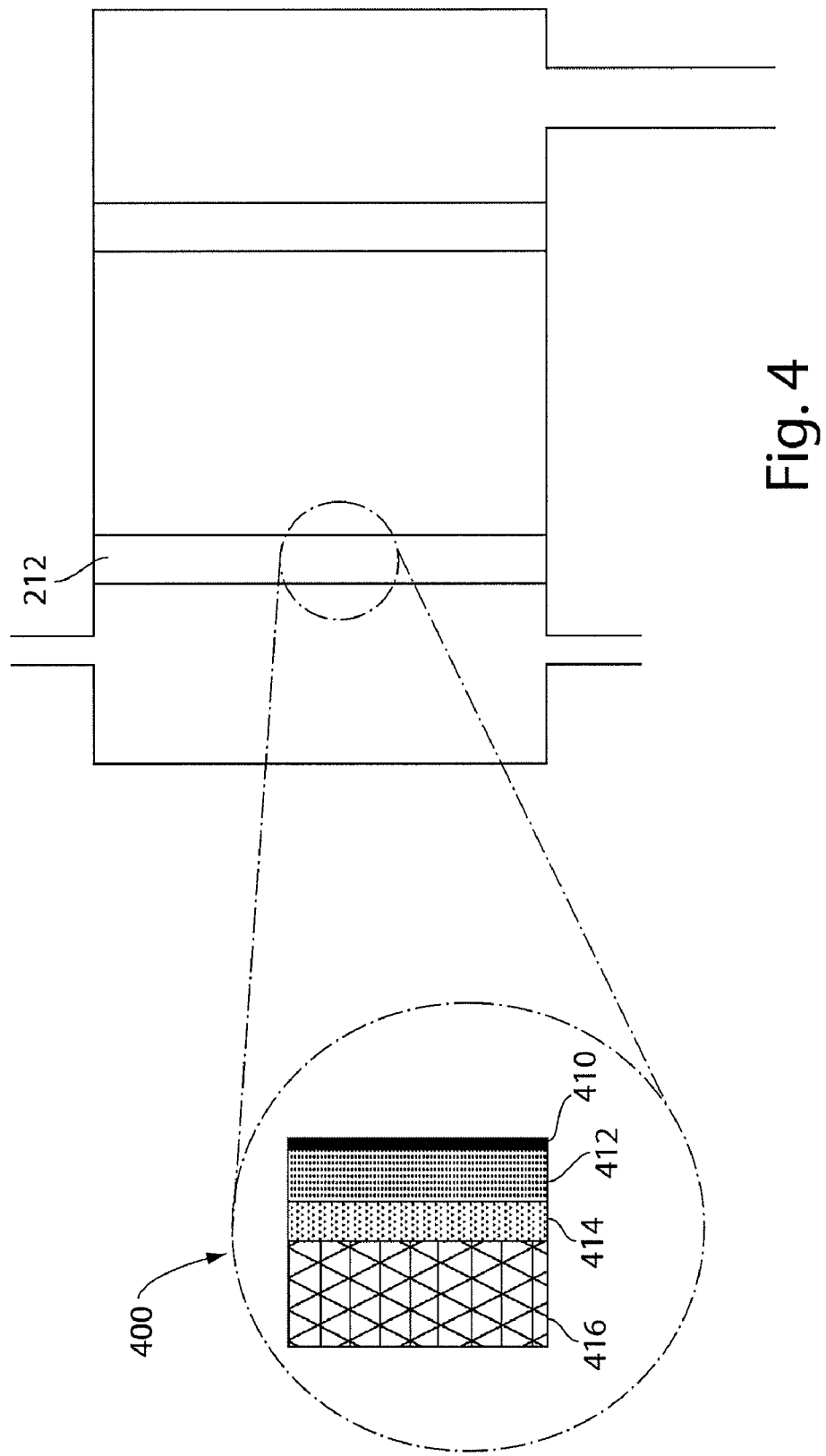
FIG. 4 is a schematic illustration of some of the components of the cathode electrode of an alkaline membrane fuel cell with a dead-ended anode.

FIG. 4 describes schematically the components of the cathode electrode for an AMFC operating with zero, or minimal supply of water from an external source. Referring to FIG. 4 with further reference to FIG. 2, the cathode electrode 212 includes as shown in the close up view 400, a catalyst layer front 410, a remainder of the catalyst layer 412, a hydrophobic microporous layer 414, and a cathode gas diffusion backing layer 416. As described above the catalyst layer front 410 is immediately adjacent to the membrane surface 214. The inclusion of a catalyst layer front 410 enhances and optimizes the MEA performance through the placement of a high concentration of active catalyst sites closest to the membrane surface 214. The rest of the catalyst layer 412 is behind the catalyst layer front 410 and adjacent to the hydrophobic microporous layer 414. The hydrophobic microporous layer 414 repels liquid water and does not allow it to cross out to the diffusion backing layer 416. The hydrophobic layer thus acts as a "water dam," lowering the rate of water escape out the cathode catalyst layer and subsequent loss into the cathode air stream. Some of the embodiments of alkaline membrane fuel cells described herein utilize non-precious metal catalysts for the electrode catalyst layers 310, 312, 410, and 412. Some examples of non-precious metal catalysts could include silver or cobalt on the cathode and nickel on the anode. These examples are provided for reference only and should not be interpreted as the only types of potential non precious metal catalysts which can be used in conjunction with the systems and methods described herein.

Figure 5:
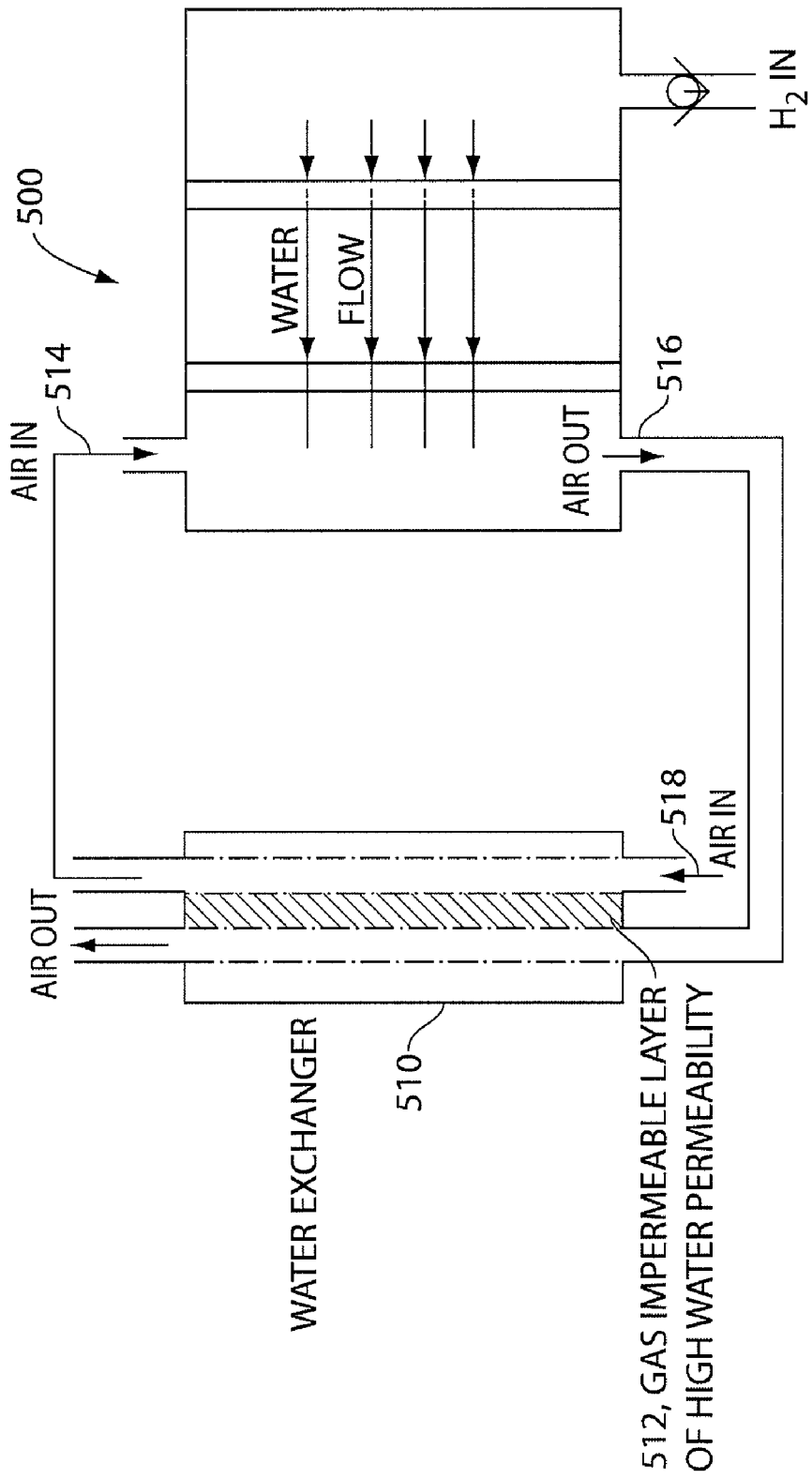
FIG. 5 is a schematic illustration of an alkaline membrane fuel cell with a water exchanger apparatus on the cathode air exhaust.

FIG. 5 describes the option of adding a water exchanger apparatus which enables incoming cathode air to collect moisture from the cathode air exhaust stream. Referring to FIG. 5, an embodiment of an AMFC 500, includes a water exchanger 510 configured and disposed to exchange water from the cathode exhaust stream to the cathode inlet stream. This exchanger device 510 may be used to humidify the inlet cathode air 514 with moisture that has been generated by the fuel cell and would otherwise be lost with the cathode exhaust 516. 512 is a membrane of high water permeability and low gas permeability enabling effective transport of water from the humidified exhaust stream to an inlet stream 516 of dry air 518, while preventing any mixing of inlet and exhaust air.

Figure 6:
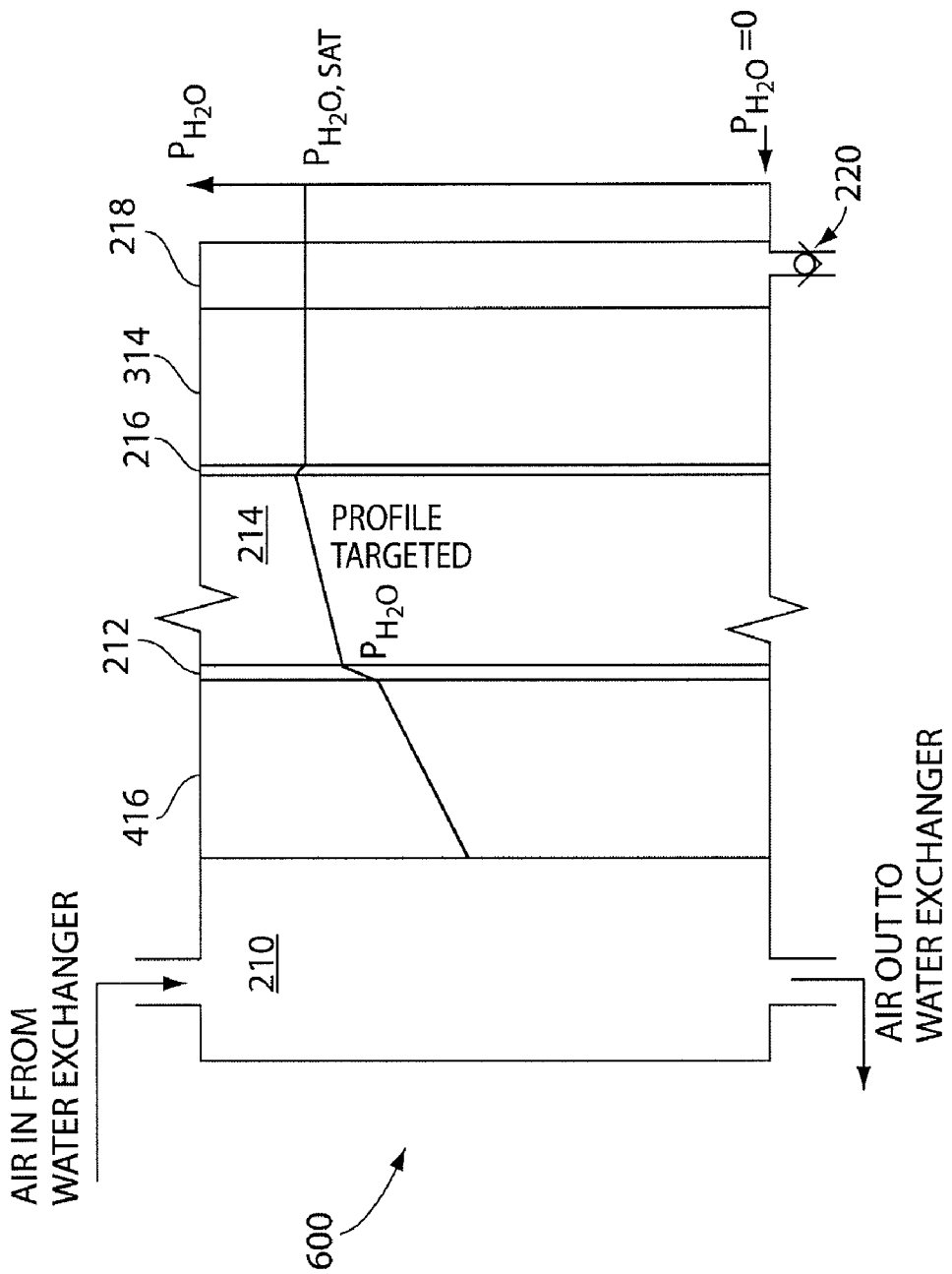
FIG. 6 is a schematic illustration of the targeted water vapor pressure variation from the anode to the cathode.

FIG. 6 depicts the nature of the water profile targeted along the thickness dimension from anode to cathode of an operating AMFC using zero, or a very low rate of external water supply. One fundamental requirement is to maintain a water gradient along the cell thickness (with a higher relative humidity on the anode and a lower humidity or water content in the cathode) in order to transport excess water product in an operating cell from the dead-ended anode to the cathode. Once the excess water has transported to the cathode, it may be removed out of the cell with the cathode air exhaust stream in liquid and/or vapor form. At the same time, however, a second fundamental requirement is that such a water gradient exists under cell operation conditions while maintaining relatively high water content all the way between the anode catalyst layer and the cathode catalyst layer. This ensures proper membrane hydration and consequently maintenance of high ionic conductivity in the membrane and within both electrodes, as required to achieve acceptable cell performance. FIG. 6 shows that the level of water activity in the anode catalyst layer corresponds to "$P^*_{H20,TCELL}$", the saturated water pressure at Tcell, the temperature of the cell. The water loss out of the MEA and into the air stream may be kept at a sufficiently moderate level through the use of a cathode backing layer (GDL) of sufficiently thick dimensions and sufficient level of wet proofing, combined with pre-humidification of the incoming cathode air stream with a water exchanger as described above in FIG. 5. The water activity at the outer edge of the cathode gas diffusion layer 416 (adjacent to the cathode flow field 210) can be maintained with these combined cell and system elements, at a significant fraction (>50%) of $P^*_{H20,TCELL}$, thereby ensuring, at the same time, a high water level throughout the MEA and a sufficient gradient between anode and cathode to release excess water.

The concept of "water activity" comes from physical chemistry. It is a term covering the "escaping tendency," or (Gibbs) free energy of different states of water, including both vapor, where the vapor pressure is the obvious measure of free energy, and water incorporated in a polymer membrane. The water activity of water in the membrane, has a certain energy state, or escaping tendency ("activity") which is measurable by the water vapor pressure in equilibrium with the membrane containing that specific amount of water.

Effective water management in an AMFC operating in a dead-ended anode configuration enables commercially significant performance to be obtained under conditions of very high fuel utilization. The water transport mechanics of FIG. 6 are shown by following the path of water from generation in the anode 218 to removal or exhaust from the cell cathode 210. First, water is generated via the chemical reaction of combining hydrogen molecules and hydroxyl (OH—) ions at the face of the membrane 214 adjacent to the anode catalyst 216. Some of the water evaporates until the partial pressure of water vapor equals the saturated vapor pressure at the temperature of the cell. If, as in the exemplary embodiment, the anode is a sealed volume due to dead-end anode configuration, and water generation rate is constant, liquid water will start to build up unless water can diffuse through the membrane 214 at a rate equal to that of water generation. Water diffuses through the membrane 214 from the anode 218 to the cathode 210 as a function of the water activity difference between the cathode and the anode. Once reaching the cathode catalyst/membrane interface, water is partially consumed as a reactant. The liquid water at the surface of the cathode catalyst layer 212 adjacent to the GDL 416 evaporates through the GDL (416) at a rate proportional to the difference between water activity in the cathode catalyst layer and the partial pressure of the water vapor in the cathode air stream flowing by the cathode GDL, and inversely proportional to cathode backing thickness. The vapor pressure on the outside edge of the cathode GDL 416 is determined by the air temperature, the air flow rate and the relative humidity of the incoming air stream. Thus, very warm dry air from a forced air blower will drastically increase the rate of water evaporation from the outer face of the cathode GDL 416.

Figure 7:
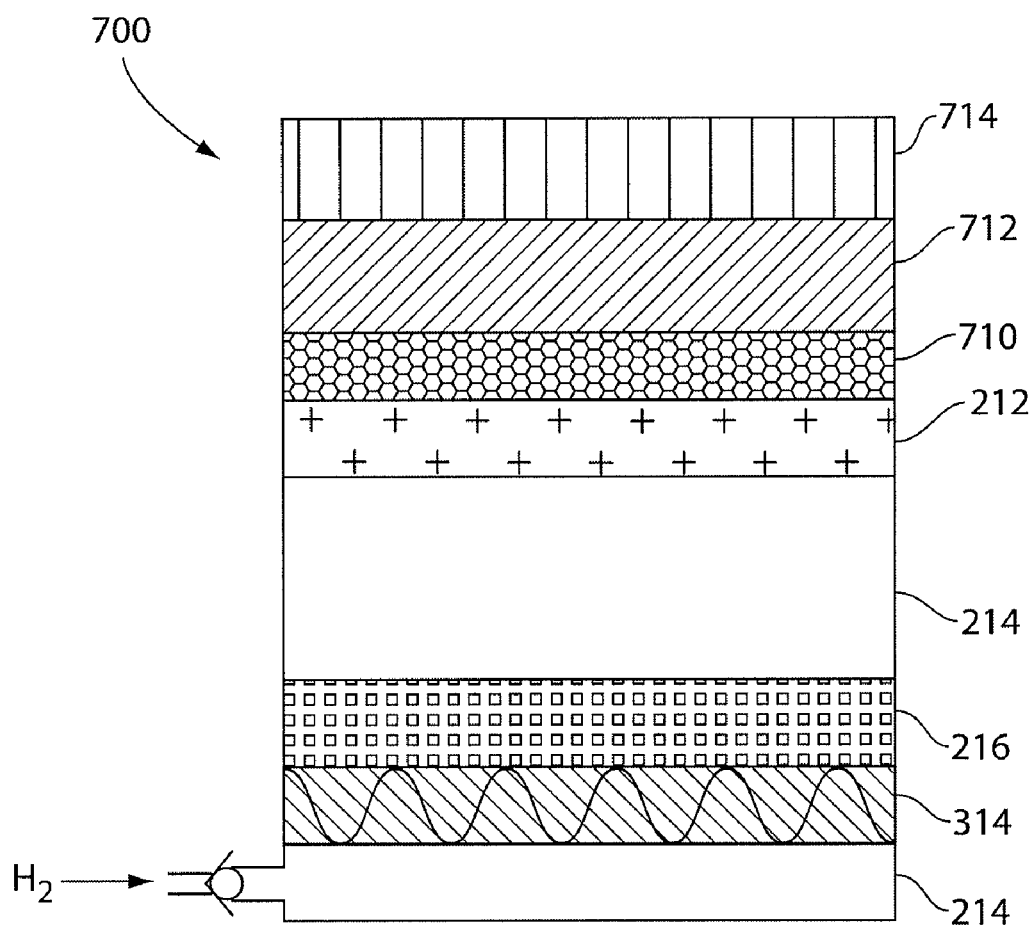
FIG. 7 is a schematic illustration of an alkaline membrane fuel cell apparatus according to the invention in a non-forced air cathode configuration.

In an alternative embodiment, as shown in FIG. 7, an AMFC 700 may be operated with dead-ended anode chamber 218 and a natural convection "air breathing" cathode configuration, using zero, or minimal supply of water from an external source. In the case of an air breathing cell, water vapor is released through the open face of the cathode by means of natural convection, and the rate of water vapor loss will be determined by the thickness and openness (porosity) of components shielding the cathode catalyst layer from the external environment. Optimization in this case can be based on a correct trade-off between shielding the AMFC cathode face 712 to prevent excessive water loss and avoiding excessive blocking of oxygen access to the cathode catalyst. The control structural and operation parameters available to achieve such optimized trade-off, are the design temperature of the operating cell and the porosity and wetting properties of layers 710, 712 separating the cathode catalyst layer 212 from the outside environment. A cathode gas diffusion layer 712, 710 of typical dimensions and porosity defines a "cathode limiting current," corresponding to the maximum rate of oxygen transport by diffusion through the GDL (no convection occurs within the layer). For a typical GDL used in a fuel cell air electrodes, this oxygen limiting current is a significant fraction of an ampere/cm². One can trade-off the cathode limiting current for better confinement (lower loss) of water in the cathode and that can be done by either increasing the thickness of the gas diffusion layer 712, 710 or by decreasing its degree of openness. The design considerations of the cathode gas diffusion layer can be better understood when looking at some equations describing oxygen and water vapor transport rates at some cell current.

Assuming the design current density is J, then the flux of incoming oxygen has to obey: $4F \times flux_{O_2}=J$, where the flux is in mol/cm²sec and is driven by a partial oxygen pressure differential of maximum 0.2 atm between air outside the cathode and the cathode catalyst 212. The required $flux_{O_2}$ has to satisfy: $=J/4F$, and thereby determines the design gas permeability of the cathode GDL for operation at current J, such permeability implemented by some combination of cathode GDL thickness and porosity.

Water vapor that escapes through the same cathode CDL, is driven by a differential in water vapor pressure between the inner surface and the outer surface of the CDL and the (same) thickness/porosity characteristics of the cathode CDL. Therefore, at some inner cell temperature, the rate of water vapor release will fulfill the condition $2F \times flux_{H_2O}=J$, where the pressure gradient determining the water vapor flux through the cathode GDL is: $P^*_{H_2O,Tcell}-P_{H_2O,amb}$, where $P_{H_2O,cell}$ is the vapor pressure in the cathode 210 and $P_{H_2O,amb}$, is the ambient water vapor pressure.

It can be seen from the above, that at some cell temperature $T_{cell}^*$ and cell current J, the required matching of the fluxes of water vapor from the cathode outward and of oxygen from air inward, both fluxes occurring through the same cathode GDL, can be derived from:

$$J_{cell} = 2F \times flux_{H_2O}$$
$$= 2F(1/\delta)D_{eff}[P^*_{H_2O,T^*cell} - P_{H_2O,amb}] =$$
$$= 4F \times flux_{O_2}$$
$$= k[4F(1/\delta)D_{eff}]0.2 \text{ atm}$$

where $\delta$ is the thickness of the cathode GDL, $D_{eff}$ is the effective diffusion coefficient of a gas through it and k is the fraction of maximum cathode current (cathode limiting current) at which the cell operates ($k=J_{cell}/J_{lim,cath}$). 0.2 atm is the maximum oxygen partial pressure differential achievable between ambient air and a cathode catalyst layer of zero oxygen pressure, as will be the case when the cathode operates under limiting current conditions. Thus, the optimum cell temperature will be determined by:

$$[P^*_{H_2O,T^*cell}-P_{H_2O,amb}]=k\, 0.4 \text{ atm}$$

The latter equation shows that, near k=1, corresponding to operation near the cathode limiting current, $P^*_{H_2O,T^*cell}$ is near 0.4 atm and this defines a cell temperature near 70 deg C. as a basis for optimized, passive water management. When operating with a GDL of same porosity and half the thickness, the same cell current will correspond to 50% of the cathode limiting current (k=½) and, consequently, $P^*_{H_2O,T^*cell}$ has to be near 0.2 atm to lose the correct amount of water and the design cell temperature should consequently be near 50 deg C. These calculations demonstrate that coupling AMFC current design and temperature design to a an optimized GDL of appropriate thickness and porosity, enables operation in air breathing mode with both sufficient rate of oxygen supply and limited rate of water loss.

The air breathing AMFC 700 includes an adjustable shutter 714. The adjustable shutter 714 may be manually or processor controlled to move in a such a fashion as to either block off or open up area on the face of the cathode backing layer 712 in order to fine tune the water loss of the cell according to the specific operating conditions. For example, at some operating conditions of the cell, such as startup, there will be low water loss combined with the desire to provide as much oxygen as possible to the catalyst sites to promote the cathode reactions.

This startup mode may be accommodated with the adjustable shutter 714 in an open state. As the temperature of the cell rises with continued operation of the cell due to electrical inefficiency losses and associated heating of the cell, the water temperature will also rise which increases the rate of water evaporation and water loss from the cell. During such a running mode, the adjustable shutter 714 may be partially closed to reduce the effective open area on the face of the cathode backing layer 712. This adjustable shutter 714 may be automated in a processor implemented control loop with one or more of the control variables being parameters such as cell temperature, cell voltage (which may give an indication of cell flooding), and current draw of the cell (or stack). The adjustable shutter 714 may offer the AMFC operator a degree of freedom that is similar to the control of a variable forced air supply from an air blower.

Effective water management in the operating AMFC is required to achieve a high hydration level across the thickness dimension of the catalyst coated membrane (CCM) for the complete range of target operation conditions. An AMFC generates water at the fuel/anode side by the process:

$$H_2 + 2OH^- = 2H_2O + 2e$$

and consumes water at the oxygen or air cathode side of the cell by the cathode process:

$$2e + (\tfrac{1}{2})O_2 + H_2O = 2OH^-$$

According to the latter process, a flux of water proportional to the AMFC current demand must be supplied continuously to the AMFC cathode. For instance, in an AMFC generating a cell current of 1000 mA/cm², the water flux demanded by the cathode process is 6 mg of water per cm² of active area per minute. If the rate of water supply to the AMFC cathode is any lower, the current will drop and adjust to the more limited flux of water available. A water consuming electrode process is a unique property of the AMFC and, consequently, effective water supply to the AMFC cathode is key for maintaining higher AMFC performance.

We disclose here three complementary approaches to water management in the AMFC, intended to address the significant challenge posed by a water consuming cathode. The first approach relies on transport of enough internally generated water from the anode side to the cathode side through the cell membrane along the active area of CCM. From the electrode formulations given above, it can be seen that 50% of the water generated at the cell anode is required for the cathode process. If a cross-the-membrane flux of water along the active area of the AMFC is well above 50% of the rate of anode water generation, then such mode of water transfer to the cathode ("mode 1") should be sufficient to both sustain the cathode process and maintain a sufficient hydration level through the cathode. The way to achieve effective hydration by "mode 1" alone, involves, in principle, use of thin membranes, preferably less than 50 micrometer thick, yet mechanically robust, in conjunction with GDLs having highly water blocking microporous layers ("MPLs"). Such combination guarantees highest water flux across a membrane made of given polymeric material at some given cell current.

Operating the AMFC in "mode 1" hydration exclusively is preferable from the perspective of cell structural and operational simplicity. Its use is limited, however, by the magnitude of the cell current at the operation design point. At steady state, the rate of change in cell water content is given by:

$$dm_{water,ss}/dt = k_1 J_{cell} - k_{2(Tcell, gas\,flow)} m_{water,ss} = 0; \quad (1a)$$

i.e., steady state water content, $m_{water,ss}$, in an operating cell without any external water supply, is reached when the rate of water generation by cell current, given as $k_1 J_{cell}$, is equal to the rate of water loss, given as $k_{2\{Tcell,\,gas\,flow\}} m_{water}$. From this equation, the steady state of water in the cell, $m_{water,ss}$, is given by:

$$m_{water,ss} = k_1 J_{cell}/k_{2\{Tcell, gas\,flow\}} \quad (1b)$$

Equation (1b) teaches that the steady state water content will increase with cell current at some cell temperature and gas flow rate. Consequently, to achieve the maximum possible water content in an AMFC at the beginning of operation with a freshly prepared CCM, a routine of gradual increase of cell current to the maximum possible value, typically near 1 A/cm², was found by us highly effective for setting a high initial cell hydration level. Such routine apparently helps to significantly swell the ionomeric membrane and the ionomeric components of the electrodes. This cell pretreatment routine facilitates achieving the high power densities in AMFCs operating without any added liquid electrolyte.

On the other hand, equation (1b) teaches that, under low cell current levels the steady state water content will drop proportionately. The water level could consequently become insufficient to secure the required water flux across the membrane, causing further drop in cell current and further loss in water. To resolve such situation, further modes of AMFC cathode hydration, beyond "mode 1," can be implemented in the design. We describe here solutions comprising "mode 2" of hydration, involving redirection to the cathode of water that escaped out the back side of GDLs, and "mode 3" of hydration, based on the supply of liquid water from an external source.

A first option of supplementing water to the AMFC cathode beyond the water flux across the membrane, is based on trapping and redirecting back to the cathode that part of cell-generated water that escaped through the backside of GDLs. On the anode side, the part of the anode-generated water that is not transferred through the membrane penetrates through the GDL into the anode flow field. In operation of the anode in open ended mode, this water will leave with the anode exhaust, whereas in operation in dead-ended mode such water could build up excessively in the anode compartment behind the GDL. We teach here effective ways to redirect water escaping through the anode GDL. In the case of an open-ended anode, the water leaving out the anode exhaust re-enters a water exchange unit where anode exhaust water content is transferred to large degree to the inlet air stream. In the case of a dead-ended anode configuration, we teach enhanced transfer of excess liquid water from the anode side of the membrane to the cathode side by means of symmetric frames made of hydrophilic material, placed adjacent the membrane surface around the GDL. The frame on the anode side provides a trap for anode water that had not traversed the membrane and facilitates passing such water over to the frame facing it on the cathode side of the membrane. Water that escapes through the cathode exhaust stream, can also be transferred to the incoming air stream by means of a second water exchange unit.

Water management utilizing a water source external to the membrane electrolyte fuel cell ("mode 3" of hydration), typically involves hydration of the CCM by humidified gas feed streams. The effectiveness of this prior-art water supply is limited, because a conflict exists between an effective supply of gas and of water through the same cathode backing layer (gas diffusion layer). In particular, humidification by water vapor is limited by the level of water vapor content in the incoming gas streams and by the limited flux of water vapor through the gas diffusion layer. Thus, effective supply of water from external sources should preferably be in the form of direct supply of liquid water to the cathode side of the AMFC. This can be done, as example, by means of an added water channel machined around the gas flow channels on the cathode side, enabling immediate contact of liquid water with the membrane surface on the cathode side. Such water supply, used in conjunction with a water wicking mesh introduced along the surface area of the membrane on the cathode side, is one option for direct liquid water supply to the AMFC cathode. Another option is to have the extra liquid water contained in a reservoir, made as an integral part of the stack structure, with liquid water wicking directly from this reservoir to the cathode side of the membrane surface at a rate which is self-controlled by the cathode hydration level.

In a further aspect of the invention belonging to "mode 3" humidification, transport of water to the cathode side of an AMFC may be accomplished by establishing side-by-side or parallel flow paths of oxygen/air and liquid water from the cathode side of the cell. A current collection and gas supply plate constructed and arranged for attachment to the cathode side of an AMFC may be configured with a gas flow field and a water channel dedicated to water transport to the cell membrane. The water channel may be configured to transport water to an area of the membrane disposed outside of the periphery of the active area of the membrane to enable water to transport or diffuse laterally along the cross-sectional area of the membrane. The plate may help to create separate transporting domains that may help to avoid segmentation along the cross-sectional area of a cathode gas diffusion layer. Water may be supplied to the channel from a source, e.g., a stationary reservoir, external to an AMFC or internally incorporated with an AMFC or an AMFC stack. Water may be supplied from an external source via a pump. Further, water may be supplied to the channel from water collecting around an active area of a membrane when the anode side of the AMFC is dead-ended.

Referring again to the "mode 3" of cell humidification, in one aspect of the invention, water may be supplied directly to the cathode side of an AMFC from an external water supply to help to mitigate the dependence of the water supply solely on fuel cell current. An AMFC designed with one or more hydrophilic wicks configured for transport of water via wicking action may help to enhance hydration of an alkaline membrane, and/or may help to enhance the rate of water transport from the anode to the cathode side of the cell. Application of a wick in the form of a mesh directly to the cathode side of an AMFC membrane may help to enhance hydration of and the amount of water along the cathode surface of the membrane via wicking action whereby the mesh transports water from a water reservoir. The water reservoir may be designed as an external component to the fuel cell stack, or may be integrated with the design of the stack. The mesh may be in the form of a thin, recast ionomer-filled separator between an AMFC membrane and cathode catalyst layer, configured as a porous structure affixed to the membrane with the recast ionomer to help to ensure continuity of the ionic path through the membrane to the catalyst layer.

Figure 8:
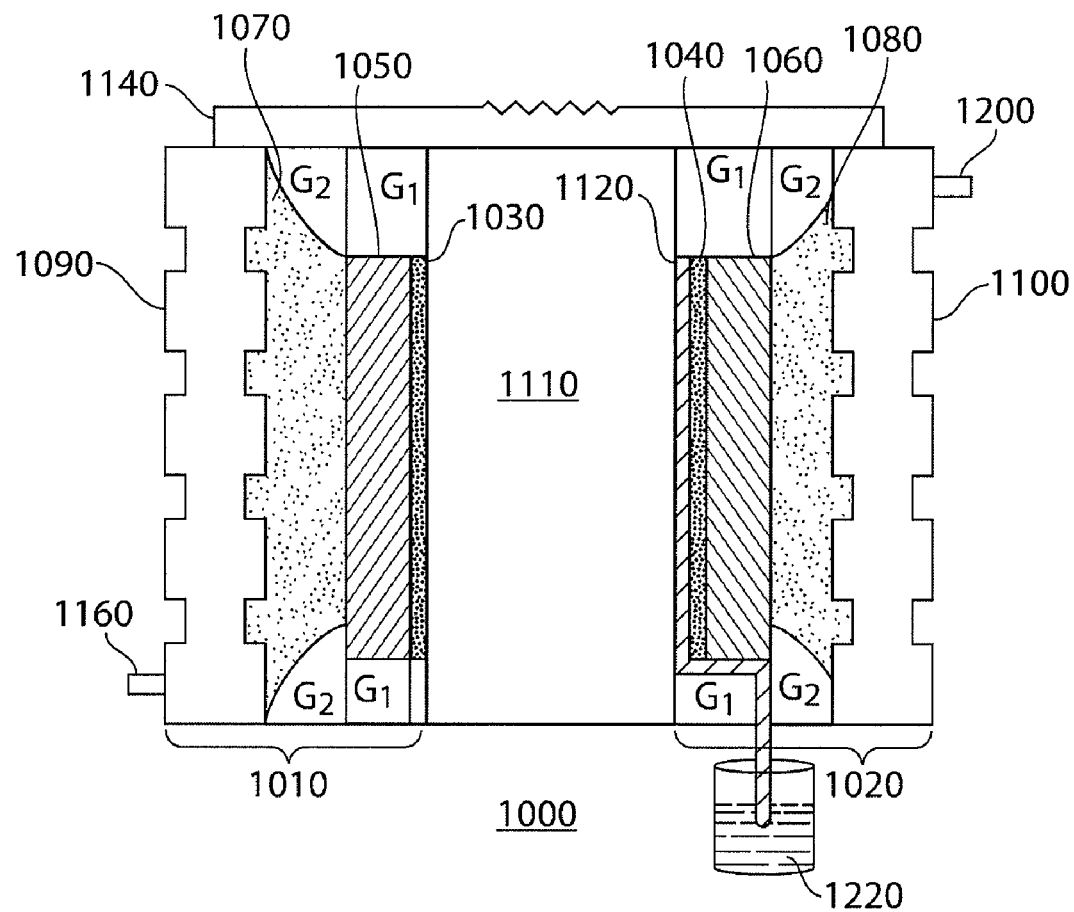
FIG. 8 is a schematic drawing illustrating a sectioned side view of a fuel cell having an alkaline polymer membrane including a micro fiber mesh according to one aspect of the invention.

Referring now to FIG. 8, in another aspect of the present invention, a fuel cell 1000 includes an anode side 1010 and a cathode side 1020 with an alkaline anion-exchange polymer membrane 1110 disposed between the anode and cathode sides to form an alkaline membrane electrode assembly. The membrane 1110 comprises one or more poly-hydrocarbon materials, and separates the anode and cathode sides 1010 and 1020 electronically and provides for the conduction of hydroxide ions. The anode side 1010 of the fuel cell 1000 includes an anode catalyst layer 1030 positioned adjacent to the membrane 1110, an anode gas diffusion layer 1050, an anode open electronically-conducting spacer 1070, and an anode bipolar plate 1090. The cathode side 1020 includes a cathode catalyst layer 1040, a cathode gas diffusion layer 1060, a cathode open electronically-conducting spacer 1080, a cathode bipolar plate 1100, the gas inlet 1200 and a hydrophilic micro-fiber mesh 1120 positioned adjacent to the membrane 1110. The cathode side 1020 further includes a water reservoir 1220.

The cathode side 1020 of the fuel cell 1000 is configured to help to supply water, at a rate independent of the fuel cell current, directly to an interface of the alkaline membrane 1110 and the cathode side 1020 of the fuel cell 1000 to help to ensure a sufficient level of water in the membrane 1110 and at the cathode side 1020. As shown in FIG. 8, the cathode side 1020 includes the porous hydrophilic micro-fiber mesh 1120 disposed between the membrane 1110 and the cathode catalyst layer 1040 to serve as such water conduit to the cathode catalyst surface adjacent the membrane 1110.

Figure 9:
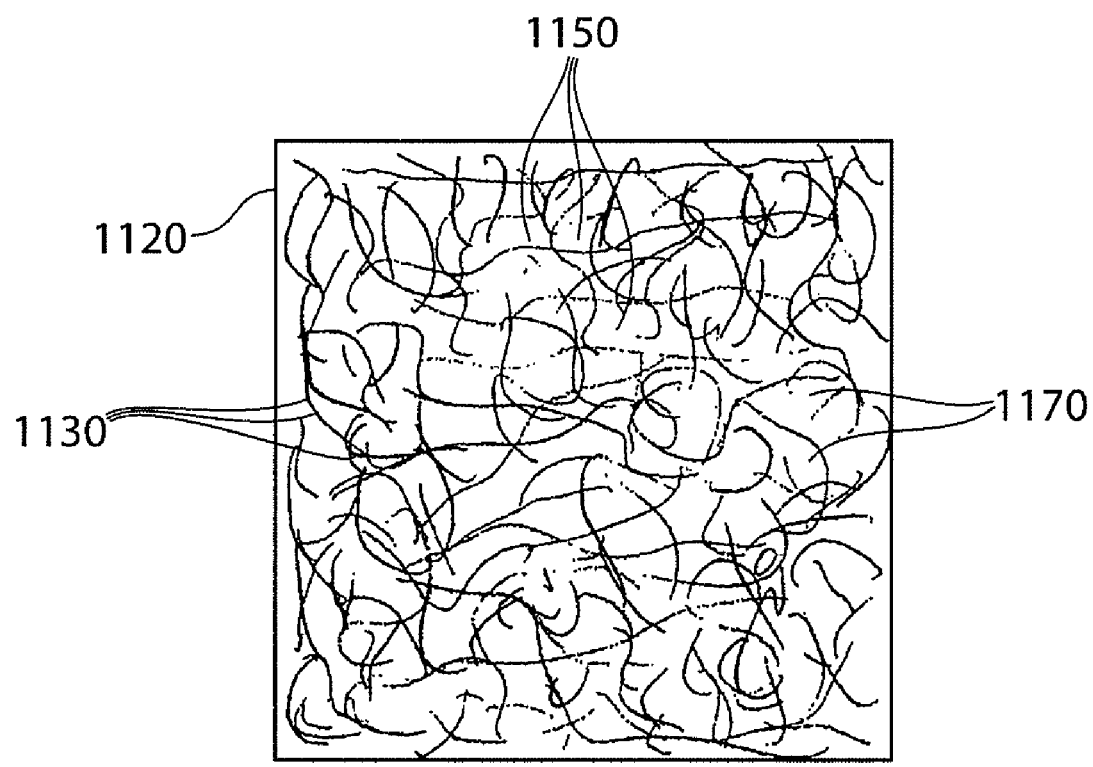
FIG. 9 is a schematic drawing of a hydrophilic micro-fiber mesh used in the fuel cell shown in FIG. 8.

Referring to FIG. 9, and with further reference to FIG. 8, the mesh 1120 comprises an array of hydrophilic fibers 1130 arranged randomly to form a mesh having a plurality of pores 1150. The mesh of hydrophilic pores helps to distribute effectively liquid water along the surface of the membrane adjacent the cathode. The pores 1150 are "filled" with or include at least one recast ionomer 1170 to help to ensure an ionic path for hydroxide ions. In one embodiment of the invention, the mesh 1120 may be formed by applying, e.g., spraying or brushing, a solution of a recast ionomer 1170 to fill the pores 1150 to form a pre-filled mesh 1120. The pre-filled mesh 1120 lies across an active area of the fuel cell 1000 between the membrane 1110 and the cathode catalyst layer 1040. In another embodiment of the invention, the mesh 1120 is placed on the cathode surface of the membrane 1110 and a solution of a recast ionomer 1170 is applied to the mesh 1120 to fill its pores 1150. Application of the recast ionomer 1170 helps to attach the mesh 1120 to the membrane 1110. The recast ionomer 1150 also helps to ensure good ionic contacts at two interfaces: between the membrane 1110 and the ionomer-filled mesh 1120 and between the mesh 1120 and the cathode catalyst layer 1040. In one embodiment, the mesh 1120 defines a thickness in a range from about 10 microns to about 25 microns, and preferably 15 microns. In one embodiment, the mesh 1120 comprises thin battery separator materials based on fibers of poly(tetra-fluoro ethylene) ("PTFE") that underwent treatment to render the surfaces of the fibers hydrophilic.

The fibers comprising the hydrophilic mesh 1120 are constructed of one or more hydrophilic materials including, but not limited to, cellulose, cotton, or surface modified PTFE, such as, for example, fiber mesh that is manufactured by and available from W.L. Gore of Elkton, Md.

The position of the mesh 1120 along the membrane 1110 enables application of water directly to the cathode surface of the membrane 1110 via a wicking action, while maintaining the continuity of the ionic path to the catalyst layer from the membrane 1110. In one embodiment, the mesh 1120 is configured and is positioned between the membrane 1110 and the cathode catalyst layer 1040, such that, the mesh 1120 helps to supply water to a substantial area of the interface between the membrane 1110 and the cathode catalyst layer 1040.

One edge of the mesh 1120 is in contact, e.g., continuous contact, with a water supply in order to supply water to the cathode side 1020 of the membrane 1110. As shown in FIG. 8, in one embodiment, a lower edge of the mesh 1120 extends from the membrane electrode assembly and into the water reservoir 1220, an appropriately sized, closed compartment dedicated to providing a water supply to the mesh 1120. The mesh 1120 supplies water to the membrane 1110 through a wicking action where the mesh 1120 remains in contact with water contained in the water reservoir 1220. As the mesh 1120 is positioned over an active area of the membrane 1110 and/or a substantial portion of the active area of the membrane 1110, the mesh 1120 helps to deliver water via wicking action to a substantial area of the interface between the membrane 1110 and the cathode catalyst layer 1040 and thereby a substantial area of the membrane 1110.

The reservoir 1220 may contain de-ionized water and may be operatively disposed external to the fuel cell stack or may be built into the overall stack design. As shown in FIG. 8, the mesh 1120 may extend through gaskets $G_1$ and $G_2$ along the cathode side 1020 into the reservoir 1220. Conversely, the mesh 1120 may extend into a water reservoir (not shown) built within the cell 1000 structure. In one embodiment, a stationary water reservoir is placed adjacent, e.g., the thickness dimension of, the stack and is equipped with a de-ionized liquid water inlet for passive water refill; each cell in the stack has a wick extending into it from the water reservoir, thereby achieving multi-cell extension of the scheme described in FIG. 8 for a single cell.

With further reference to FIGS. 8 and 9, assembly of the fuel cell 1000 includes, in one embodiment, applying the hydrophilic fiber mesh 1120 to the cathode side 1020 of the membrane 1110 and brushing or spraying the mesh 1120 with a sufficient amount of one or more recast ionomers to substantially fill the pores 1150 of the mesh 1120. The cathode catalyst layer 1040 is then applied by spraying or brushing a catalyst ink over the mesh 1120 and the membrane 1110, wherein, as mentioned above, the catalyst ink includes a mixture of a solid catalyst and dissolved ionomer. Deposition of the catalyst layer 1040 onto the ionomer-filled mesh 1120 helps to form a continuous ionic path from the membrane 1110 to the cathode catalyst layer 1040. The gas diffusion layer 1060 is then applied over the catalyst layer 1040, and the cathode bipolar plate 1100 is positioned to abut the gas diffusion layer 1060. In one embodiment, the cathode open conducting spacer 1080 is positioned between the gas diffusion layer 1060 and the bipolar plate 1100. The anode side 1010 of the fuel cell 1000 is similarly assembled with the exception the mesh 1120 is not included along the anode side 1010.

The edges of the fuel cell 1000 are sealed by pressing a planar edge of each bipolar plate 1090 and 1100 over a pair of gaskets $G_1$ and $G_2$. A first gasket $G_1$ is positioned directly adjacent the membrane 1110. A second gasket $G_2$ covers and extends over the edges of the gas diffusion layers 1050 and 1060 and covers and extends over the first gasket $G_1$. A portion of the mesh 1120 is slipped through the pair of gaskets $G_1$ and $G_2$ to an area external to the fuel cell 1000 where it is received into the reservoir 1220. The fuel cell 1000 thereby helps to maintain the mesh 1120 in continuous contact with water contained within the reservoir 1220.

Figure 10:
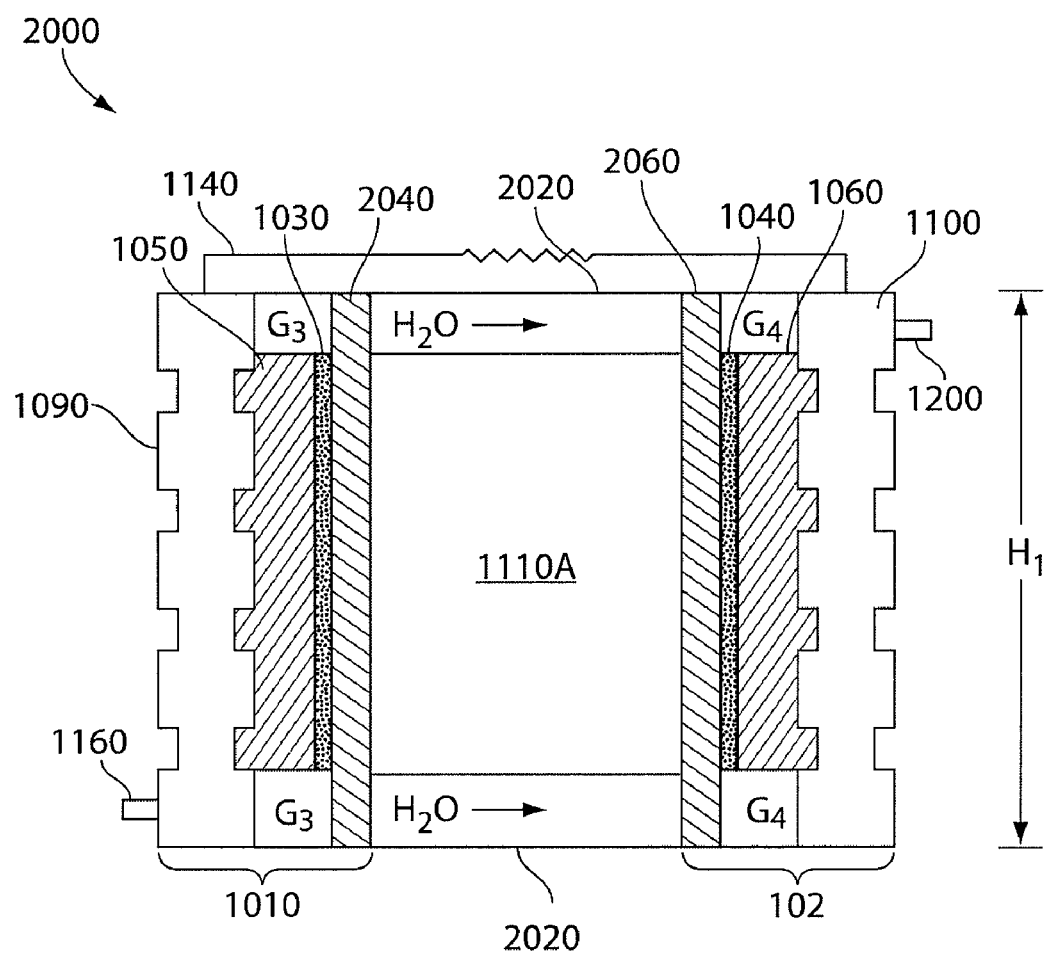
FIG. 10 is a schematic drawing illustrating a sectioned side view of a fuel cell having an alkaline polymer membrane including an anode wick, a cathode wick, and a water-permeable film around the membrane according to another aspect of the invention.

Referring to FIG. 10, in another aspect, the invention provides a fuel cell 2000 configured to help to facilitate transport of water generated at the anode side 1010 of the cell 2000 to the cathode side 1020, as will be particularly important in operation in dead-ended anode mode. The fuel cell 2000 design employs anode and cathode wicks 2040 and 2060 to transfer anode-generated water to the cathode side 1020 of the membrane 1110A to help to enhance the rate of water transport to the cathode reaction. In addition, the cross-sectional area of the fuel cell 2000 is configured to accommodate an extended area of the membrane 1110A that defines a highly water-permeable polymeric film configured as a frame 2020 around the membrane 1110A. The wicks 2040 and 2060 permit transport of water from the anode 1010 to the cathode side 1020 of the cell 2000 along the membrane 1110A periphery. In addition, the wicks 2020 and 2060 and the frame 2020 significantly enhance the rate of water transport from the anode 1010 to the cathode side 1020 of the fuel cell 2000.

The fuel cell 2000 illustrated in FIG. 10 is constructed with similar components as included in the fuel cell 1000 illustrated in FIG. 8, and like reference numerals are used to indicate similar components. The anode side 1010 of the cell 2000 includes the anode wick 2040, the anode catalyst layer 1030, the anode gas diffusion layer 1050, and the anode bipolar plate 1090 including the gas inlet 1160. The cathode side 1020 of the cell 2000 includes the cathode wick 2060, the cathode catalyst layer 1040, the cathode gas diffusion layer 1060, and the cathode bipolar plate 1100 including the gas inlet 1200. The alkaline membrane 1110A is disposed between the anode and cathode sides 1010 and 1020 of the cell 2000.

As shown in FIG. 10, the water permeable film frame 2020 comprises a frame around the active ion-conducting area of the membrane 1110A. In one embodiment, the membrane 1110A is constructed to integrate the frame 2020, such that, the membrane 1110A and frame 2020 form a unitary component. In another embodiment, the frame 2020 is a separate component and is positioned adjacent the periphery of the membrane 1110A when the cell 2000 is assembled. The frame 2020 is constructed of one or more polymer films and/or meshes and has significantly high water permeability relative to the water permeability of the membrane 1110A. The polymer films or meshes suitable for constructing the frame 2020 include polymers exhibiting high water uptake and high water permeability, including, but not limited to, polyalcohol polymers, such as polyvinyl alcohol (PVA). The polymer films contained in frame 2020 do not require high gas separation properties.

The wicks 2040 and 2060, as mentioned, are positioned along the anode side 1010 and the cathode side 1020 of the fuel cell 2000. Each wick 2040 and 2060 is configured to extend from one edge of the cell 2000 to an opposite edge of the cell 2000, e.g., along the height $H_1$ of the cell 2000, in facing relation to the membrane 1110A. As shown in FIG. 10, the wicks 2040 and 2060 are disposed between the membrane 1110A and the respective catalyst layers 1030 and 1040, and extend beyond the active ion-conducting area of the membrane 1110A. The extended portions of the wicks 2040 and 2060 are disposed adjacent to and are in contact with the frame 2020, such that, the frame 2020 is sandwiched between the anode wick 2040 and the cathode wick 2060 along two sides of the cell 2000, e.g., along the top and the bottom edges of the cell 2000. The wicks 2040 and 2060 are further positioned, such that, at least a portion of the wicks 2040 and 2060 contacts at least a portion of a surface of the membrane 1110A. A pair of gaskets $G_3$ and $G_4$ disposed around a periphery of the membrane electrode assembly help to seal the wicks 2040 and 2060 and the frame 2020. In one embodiment, the seal that the gaskets $G_3$ and $G_4$ create substantially seals the frame 2020 from flow of gases supplied to the fuel cell 2000.

The wicks 2040 and 2060 are constructed of hydrophilic materials, e.g., an array of hydrophilic fibers and/or hydrophilic material, and are configured to transport water to the membrane 1110A via wicking action. In addition, the wicks 2040 are configured to transport water along their surfaces to the water permeable frame 2020. As shown in FIG. 10, the anode wick 2040 receives and transports anode-generated water along its surface to the frame 2020. The water permeable frame 2020 receives the anode-generated water and transmits water there through to the cathode wick 2060. The cathode wick 2060 receives and transports water along its surface to an interface between the membrane 1110A and the cathode catalyst layer 1040 thereby enhancing the rate of water transport to the catalyst side of the membrane 1110A. The wicking action that the cathode wick 2060 achieves helps to enhance water transport to a substantial area of the membrane 1110A and the catalyst layer 1040 along the cathode side.

Figure 11:
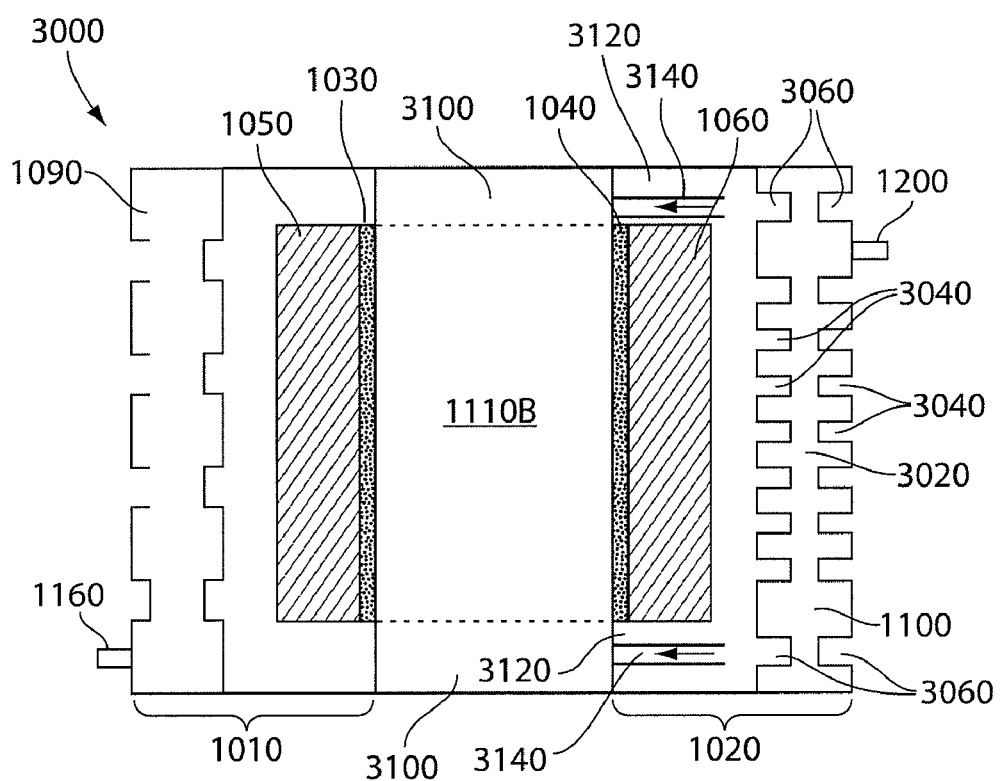
FIG. 11 is a schematic drawing illustrating a sectioned side view of a fuel cell including a current collection and gas supply plate according to another aspect of the invention.
Figure 12:
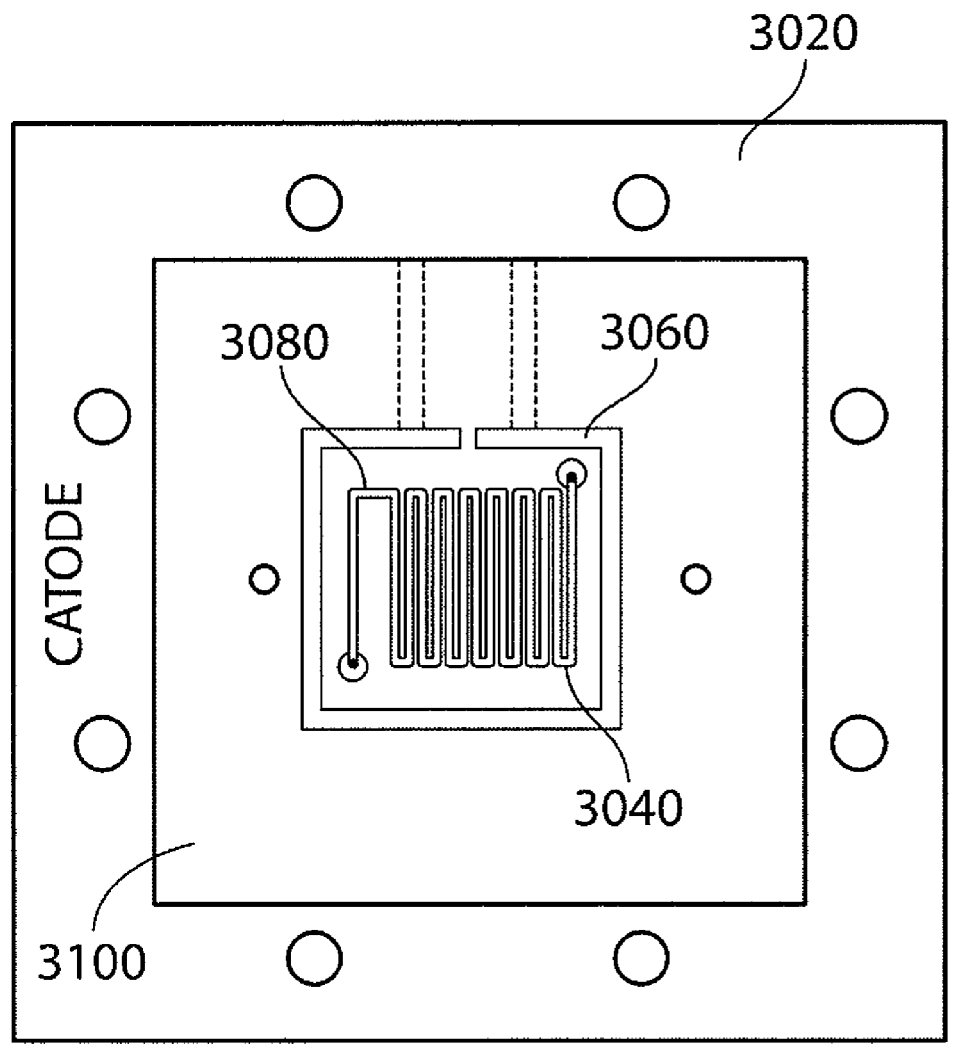
FIG. 12 is a schematic top view of the plate shown in FIG. 11.

Referring to FIGS. 11 and 12, in another aspect, the invention provides a fuel cell 3000 constructed and arranged to help to supply liquid water directly to the surface of the membrane component of the membrane electrode assembly and just outside the periphery of the active area of the membrane. Again, as with FIG. 10, like reference numerals to the fuel cell 1000 are used to indicate similar components. The fuel cell 3000 design avoids application of water to the active area of the membrane through the gas diffusion layer by supplying liquid water directly to the membrane surface just outside, e.g., a few millimeters from, the periphery of the active area. In this manner, the fuel cell 3000 design helps to deliver water to the water-consuming cathode side of the membrane. As described below, test results suggest that water propagates along the lateral dimension of the membrane and helps to enhance the fuel cell 3000 performance, particularly on the cathode side, to thereby increase the current the cell 3000 produces.

The fuel cell 3000 illustrated in FIG. 11 is constructed with similar components as included in the fuel cells 1000 and 2000 illustrated in FIGS. 8 and 10, where like reference numerals are used to indicate similar components, with the differences described below. The anode side 1010 of the cell 3000 includes the anode catalyst layer 1030, the anode gas diffusion layer 1050, and the anode bipolar plate 1090 including the gas inlet 1160. The cathode side 1020 of the cell 3000 includes the cathode catalyst layer 1040, the cathode gas diffusion layer 1060, and a current collection and gas supply plate 3020 including the gas inlet 1200. The current collection and gas supply plate 3020 abuts the gas diffusion layer 1060. An alkaline membrane 1110B is disposed between the anode and cathode sides 1010 and 1020 of the cell 3000.

FIG. 12 illustrates a schematic end view of the current collection and gas supply plate 3020 that is positioned along the cathode side of the cell 3000. The plate 3020 is constructed and arranged to help to deliver oxygen gas or air to the cathode side 1020 of the membrane electrode assembly, and is further constructed and arranged to help to supply liquid water to the periphery 3100 of the active area-of the membrane 1110B. The plate 3020 defines a gas flow field 3040, e.g., a single channel, serpentine shaped field, along one surface that is configured and disposed to help to delivery oxygen gas or air to an active area 3080 of the membrane 1110B. In one embodiment, the flow field 3040 is positioned at approximately the center of the plate 3020. When the fuel cell 3000 is assembled, the flow field 3040 is in fluid communication with the membrane active area 3080. The plate 3020 further defines a water supply channel 3060, e.g., a single loop, which is configured to help to deliver water directly to the membrane 1110B adjacent to and outside of, e.g., a few millimeters from, the periphery of the active area 3080. When the cell 3000 is assembled, the water supply channel 3060 contacts at least a portion of an area 3100 of the membrane 1110B adjacent to and outside the periphery of the active area 3080 of the membrane 1110B. The configuration and arrangement of the plate 3020 and the membrane 1110B, help to create a side-by-side, or separate and parallel, transport of oxygen gas/air and water to the membrane electrode assembly. The flow field 3040 of the plate 3020 helps to transport oxygen/air to the cathode gas diffusion layer 1060 and the single loop channel 3060 helps to transport water to the outside area 3100 of the membrane 1110B. In this manner, the cell 3000 design creates separate transporting domains and avoids segmentation along the cross-sectional area of the cathode gas diffusion layer 1060 as required to achieve water supply through the gas diffusion layer 1060.

Figure 13A:
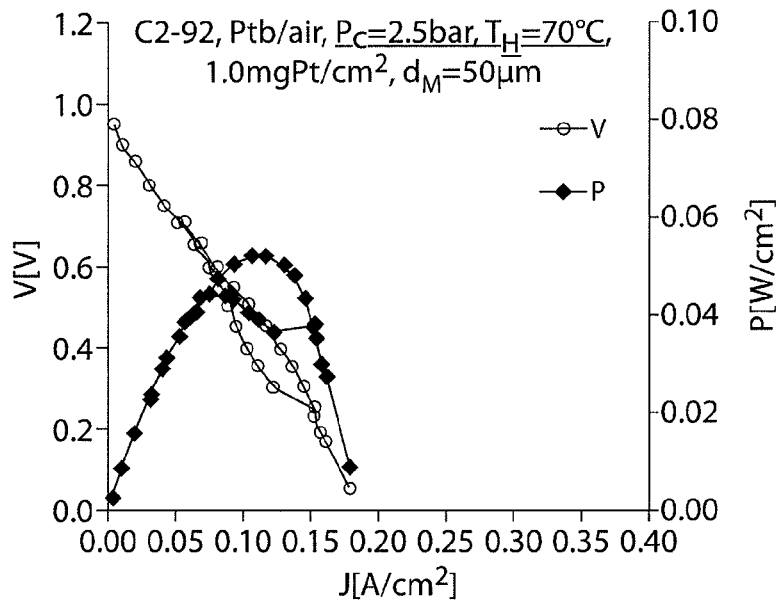
FIGS. 13A and 13B are graphs displaying fuel cell performance results with and without a supply of water to the cathode side of the cell.
Figure 13B:
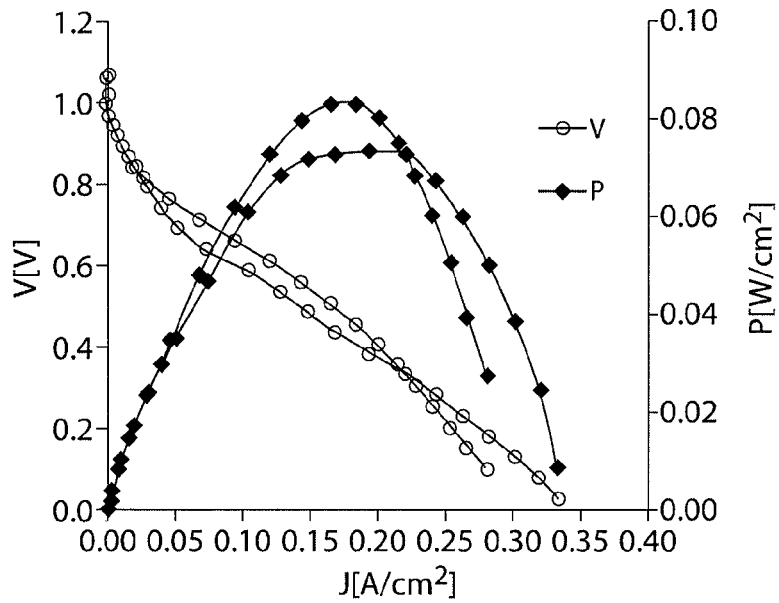

Referring now to FIGS. 13A and 13B, test results indicate that the membrane area 3100 of FIG. 11 permits water to transport effectively from the peripheral channel 3060 along the lateral dimension-of the membrane 1110B to the active area 3080 to supply water to the active area 3080 during operation of the cell 3000. Transport of water along the lateral dimension of the membrane 1110B is expected to be proportional to the ratio of the cross-sectional area of the membrane 1110B to the distance of water transport required along the major surface of the membrane. Due to the relatively small or narrow cross-sectional area of the membrane 1110, water transport is expected to be significantly lower than along the thickness dimension of the membrane 1110B and reliance on lateral diffusion of water through the membrane 1110B material could seem unrealistic. Despite the potential barrier to lateral water transport that may result from the relatively small cross sectional dimension of the membrane 1110B and the significant distance of transport, results shown in FIGS. 13A and 13B reveal the beneficial effect of the supplemental supply of water directly to the cathode side of the membrane 1110B along the area 3100 outside the periphery of the active area 3080 of the membrane 1110B.

FIG. 13A shows the test results of the operation of an AMFC with an air supply to the cathode side of the membrane electron assembly. With the AMFC conductivity depending strongly on water content to the cathode side, the cathode performance becomes limited in operation on air when water is provided to the cell by cell current alone. This is because cell currents generated in operation on air are significantly lower than in operation on neat oxygen. In comparison, FIG. 13B shows the test results of the operation of an AMFC constructed and arranged as shown in FIGS. 11 and 12, indicating direct supply of water to the cathode side of the membrane electrode assembly by means of a liquid water channel surrounding the active area helps to increase, e.g., double, the cell current output of the AMFC.

While we believe that these unexpected test results can have different interpretations, and the invention does not rely upon any one particular interpretation of the results, one possible interpretation and/or explanation is that the area 3100 of the membrane 1110B permits water to transport laterally along an outer surface of the membrane 1110B rather than through the cross-sectional area of the membrane 1110B. Under this interpretation or explanation, the rate of lateral water transport along a membrane of an AMFC could enable the higher performance that we report, and which is illustrated in FIG. 13B.

Transport of water as a thin film along the outside surface of membrane 1110B would be facilitated and thereby enhanced if the thin film of water deposited from the liquid water channel penetrates under a gasket that covers the periphery of the membrane 1110B. With further reference to FIG. 11, in one embodiment, the cell 3000 includes a gasket 3120 disposed between the plate 3020 and the membrane electrode assembly. The gasket 3120 is configured and sized to cover the peripheral edges of the active area 3080 of the membrane 1110B. The gasket 3120 also includes a slot 3140 that, when the plate 3020 is assembled with the membrane electrode assembly and the gasket 3120, is disposed over the single loop channel 3060. The slot 3140 is configured to permit water transport to the surface of the membrane 1110B. When assembled with the plate 3020 and membrane electrode assembly, the gasket 3120 helps to prevent water from permeating or spreading beyond the borders of the single loop channel 3060 that are defined collectively by the plate 3020 and the gasket 3120. This configuration, however, does not prevent water transport along the interface of the membrane 1110B-opening up the possibility of water migration along the interface between the membrane and the cathode catalyst layer 1040.

The latter mode of water distribution can be further improved by adding a water wick, e.g., the mesh 1120, covering the cathode side surface of the membrane 1110B, as described with reference to FIG. 8. The water channel 3060 is thereby replacing the wicking action external to the cell, as described in FIG. 8, and enhancing the rate of supply of water from an external reservoir to the periphery of the active area and taking, at the same time, advantage of the subsequent effective lateral distribution of water by the water-wicking mesh 1120 covering the cathode active area.

Figure 14:
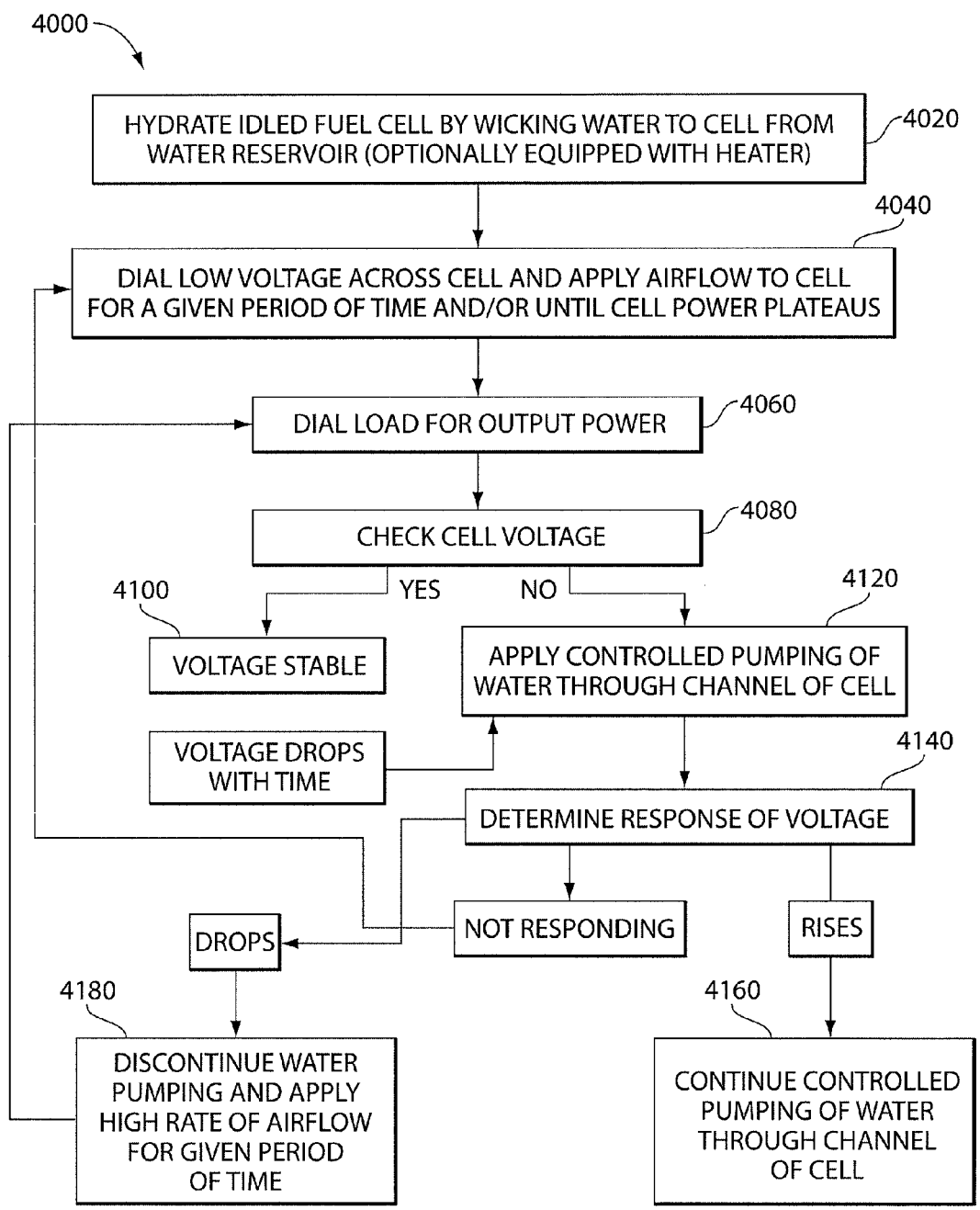
FIG. 14 is a block flow diagram of a method of pretreatment and continuous active hydration of a fuel cell according to another aspect of the invention.

Referring to FIG. 14, in another aspect, the invention provides a method 4000 of pretreatment of and effective water supply to a fuel cell, such as any of the fuel cells described above with reference to FIGS. 8-13B, to bring the fuel cell to its full power output and thereafter to maintain this full power output to the degree it depends on the level of hydration of the ionomer components in the electrodes and in the membrane. The method 4000 shown in the block flow diagram illustrated in FIG. 14 is exemplary only and not limiting. The method 4000 may be altered, e.g., by having stages added, removed or rearranged. In general, the method 4000 includes pretreatment or preconditioning of a fuel cell 1000, 2000, and 3000 involving passing current through the cell 1000, 2000, and 3000 for a given period of time and thereby hydrating the cell membrane 1110, 1110A, and 1110B and other ionomer components of the cell, to help to achieve a level of humidification that helps to increase the degree of ionic conductivity of the membrane and components.

At stage 4020, provide idle assembled fuel cell 1000, 2000, and 3000, e.g., a hydrogen/oxygen alkaline polymer electrolyte membrane fuel cell including an ion-conducting membrane 1110, 1110A, and 1110B and place fuel cell in contact with passively-wicked water, e.g., contained in water tank and kept warm at a preferred or required temperature, wherein cell 1000, 2000, and 3000 is at "off" state.

At stage 4040, dial low voltage, e.g., near about 50 mV, across the cell 1000, 2000, and 3000, and apply airflow, e.g., high rate of airflow, for given period of time, e.g., from about 5 to about 10 minutes, and/or until power plateaus, wherein cell 1000, 2000, and 3000 is at "on" state.

At stage 4060, dial load for output power required.

At stages 4080, assess whether voltage is under or in accordance with cell 1000, 2000, and 3000 specifications.

If voltage is in accordance with cell specifications, at stage 4100, determine if voltage remains stable, and if voltage drops with time, at stage 4120, apply controlled pumping of water through water channel and into cell 1000, 2000, and 3000.

If voltage is under cell specifications, proceed to stage 4120 as described to apply controlled pumping of water through water channel and into cell 1000, 2000, and 3000.

At stage 4140, determine response of voltage to application of water. If cell voltage responds and rises in response to application of water, continue controlled pumping of water at stage 4160.

If cell voltage does not respond to application of water, return to one or more of stages 4060 thru 4100.

If cell voltage drops after controlled pumping of water, at stage 4180, discontinue water and apply a high rate of airflow for a given period of time, e.g., about 10 minutes.

Example 1

CCM was prepared by direct spray application of a catalyst ink to the surface of an anion conducting membrane (Tokuyama). The inks for either cathode or anode did not contain any platinum and were each based on a solution of an OH— ion conducting ionomer. The membrane was placed during the spray process on a vacuum table and the CCM was subsequently pressed together at 100-400 bars. The thickness of the catalyst layer was under 5 micrometers. Following CCM activation in the cell by passage of current at cell voltage of 50 mV for about 30 minutes, to reach a current plateau of 1 A/cm2, the cell generated peak power of 260 mW/cm2 in operation on hydrogen and oxygen at cell temperature of 65 degrees Celsius. The power/current curve is shown in FIG. 15 side-by-side with previous reports for liquid-electrolyte-free AMFCs, using Pt catalysts (University II), non-Pt cathode catalyst (Industry I) and Pt-free cell (University I).

Figure 15:
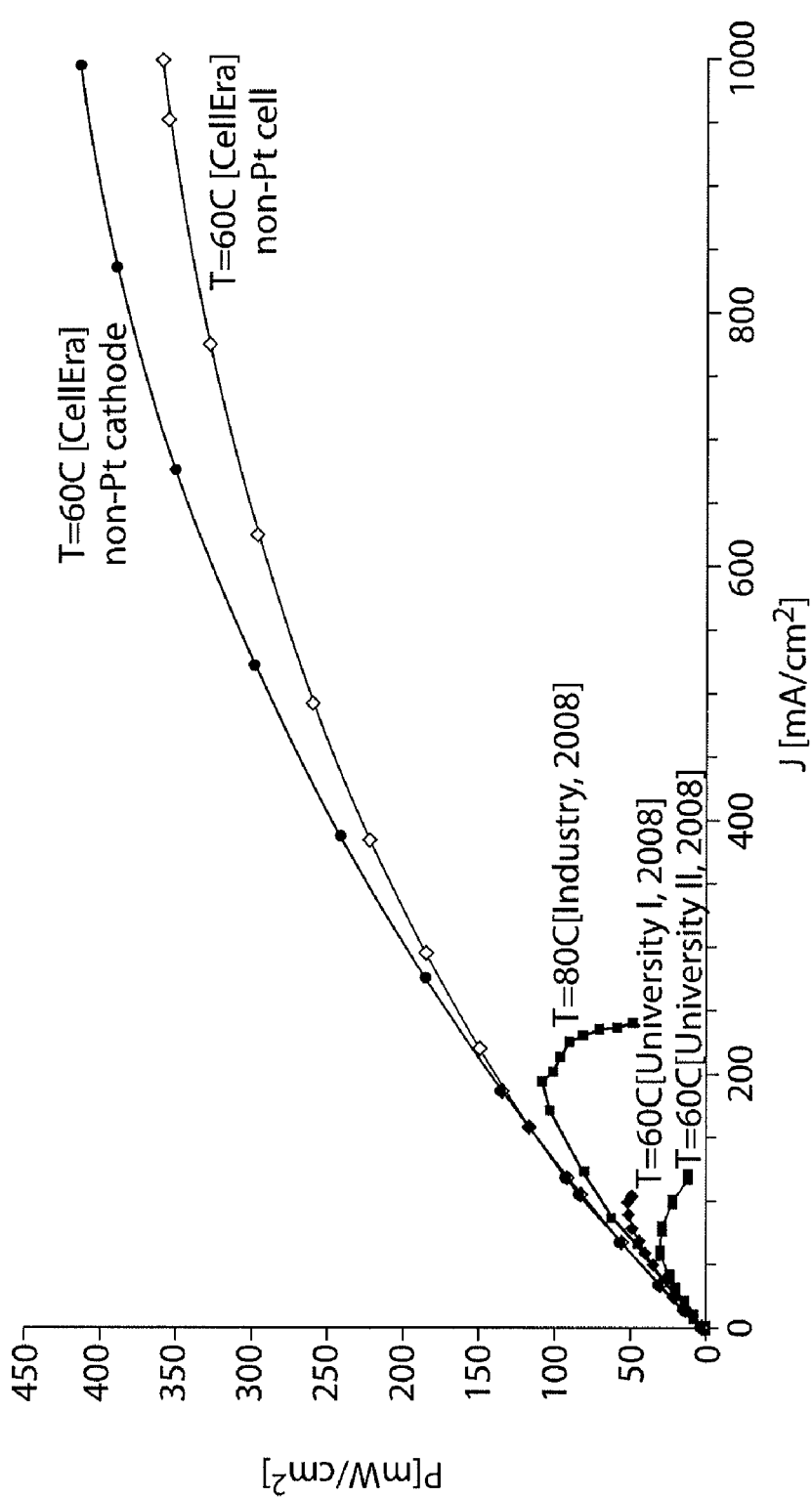
FIG. 15 is a graph displaying fuel cell performance in accordance with the disclosure of Example 1 herein.

References in FIG. 15 are to the following sources:
"University I"
Shanfi Lu, Jing Pan, Aibin Huang, Lin Zhuang, and Juntao Lu. "Alkaline polymer electrolyte fuel cells completely free from noble metal catalysts," PNAS 2008 105:20611-20614.
"University II"
Jin-Soo Park,* Gu-Gon Park, Seok-Hee Park, Young-Gi Yoon, Chang Soo Kim, Won Yong Lee. "Development of Solid-State Alkaline Electrolytes for Solid Alkaline Fuel Cells," Macromol. Symp. 2007, 249-250, 174-182.
"Industry I":
A. Filpi, M. Boccia and H. A. Gasteiger, "Pt-free Cathode Catalyst Performance in H2/O2 Anion-Exchange Membrane Fuel Cells," ECS Transactions 16(2), 1835-1845 (2008).

In describing embodiments of the invention, specific terminology is used for the sake of clarity. For purposes of description, each specific term is intended to at least include all technical and functional equivalents that operate in a similar manner to accomplish a similar purpose. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties are specified herein for embodiments of the invention, those parameters can be adjusted or rounded-off to approximations thereof, within the scope of the invention unless otherwise specified. Moreover, while this invention has been shown and described with references to particular embodiments thereof, those skilled in the art will understand that various substitutions and alterations in form and details may be made therein without departing from the scope of the invention; further still, other aspects, functions and advantages are also within the scope of the invention.

A number of embodiments of the invention have been described. Nevertheless, it will be understood that various modifications may be made without departing from the spirit and scope of the invention. Accordingly, other embodiments are within the scope of the following claims.

What is claimed is:

1. An alkaline membrane fuel cell, the fuel cell comprising:
an anode electrode;
a polymer membrane electrolyte configured to conduct hydroxyl (OH—) ions, the membrane being in physical contact with the anode electrode on a first side of the membrane; and
a cathode electrode in physical contact with a second opposite side of the membrane;
wherein the fuel cell is configured and disposed with a substantially dead ended anode chamber and is configured to transfer water from the anode electrode through the membrane to the cathode electrode at a rate substantially equivalent to water generation at the anode electrode; and
wherein water transport across the membrane is facilitated by a highly hydrophilic membrane or mesh shaped and placed as a frame around the active area on both the anode and cathode sides.

2. The fuel cell of claim 1, further comprising a mixed hydrophilic/hydrophobic microporous layer proximate to the anode electrode and a gas diffusion layer proximate to the microporous layer.

3. The fuel cell of claim 1, further comprising a hydrophobic microporous layer proximate to the cathode electrode and a gas diffusion layer proximate to the microporous layer.

4. The fuel cell of claim 3, when operating in air breathing mode, further comprising an adjustable shutter proximate to the gas diffusion layer.

5. The fuel cell of claim 3, when operating in air breathing mode with the cathode GDL thickness and porosity designed for a water vapor rate of release matching a selected cell current, Jcell and inner cell temperature, Tcell according to the equation: $P^*_{H20,Tcell}=0.4[Jcell/Jlim.cath]atm.$, where $P^*_{H20,Tcell}$ is the water vapor pressure at Tcell and Jlim.cath is the limiting current corresponding to the max transport rate of oxygen from air through the GDL.

6. The fuel cell of claim 1 wherein initial activation of the cell achieved by setting the cell voltage at about or near 50 mV and keeping it at this voltage until the cell current plateaus while the cell temperature reaches a target operation temperature.

7. The fuel cell of claim 6 wherein the current plateaus near 1 A/cm2 and the cell operation temperature is between 60 and 70 degrees Celsius.

8. The fuel cell of claim 1, wherein the substantially dead-ended anode further includes a one-way valve, the one-way valve opening periodically to the ambient by internal pressure buildup and possible temporary use of high flow of hydrogen to periodically purge water buildup.

9. An alkaline membrane fuel cell, the fuel cell comprising:
an anode electrode;
a polymer membrane electrolyte configured to conduct hydroxyl (OH—) ions, the membrane being in physical contact with the anode electrode on a first side of the membrane; and
a cathode electrode in physical contact with a second opposite side of the membrane;
wherein the fuel cell is configured and disposed with a substantially dead ended anode chamber and is configured to transfer water from the anode electrode through the membrane to the cathode electrode at a rate substantially equivalent to water generation at the anode electrode; and
wherein direct supply of liquid water to the cathode side of the membrane is provided by means of a water channel about 1 millimeter wide surrounding an active area of the fuel cell.

10. The fuel cell of claim 9 wherein water transfer from the water channel to and along the membrane surface is facilitated by a wicking mesh incorporated as part of the membrane on the side adjacent the cathode catalyst.

11. The fuel cell of claim 10 wherein the wicking mesh is incorporated to become an integral part of the membrane by placing it along the major surface of the membrane during membrane casting.

12. The fuel cell of claim 10 wherein the wicking mesh is attached onto the surface of a pre-fabricated membrane by using a solution of an ionomer to fill spaces in the mesh and to provide a bonding function following subsequent ionomer recasting.

13. The fuel cell of claim 9 wherein the liquid water supply to the cathode side of the membrane is provided from a stationary reservoir of liquid water with the water wicked from such reservoir into and along the cathode side of the membrane.

* * * * *

UNITED STATES PATENT AND TRADEMARK OFFICE
CERTIFICATE OF CORRECTION

| | | |
|---|---|---|
| PATENT NO. | : 7,943,258 B2 | Page 1 of 1 |
| APPLICATION NO. | : 12/477669 | |
| DATED | : May 17, 2011 | |
| INVENTOR(S) | : Shimshon Gottesfeld et al. | |

It is certified that error appears in the above-identified patent and that said Letters Patent is hereby corrected as shown below:

On the Title Page Item (75) In the Inventors:

"Stanislav David Simakov" should be -- David Stanislav Simakov --

In the Claims Col. 23:

Claim 5, line 43 the phrase "Jlim.cath" should read -- Jlim,cath --

Signed and Sealed this
Twelfth Day of July, 2011

David J. Kappos
*Director of the United States Patent and Trademark Office*